US012752872B2

(12) United States Patent
Kataoka et al.

(10) Patent No.: US 12,752,872 B2
(45) Date of Patent: Oct. 6, 2026

(54) VEHICLE DETECTING DEVICE, LIGHT DISTRIBUTION CONTROLLING DEVICE, AND VEHICLE DETECTING METHOD

(71) Applicant: Koito Manufacturing Co., Ltd., Tokyo (JP)

(72) Inventors: Takuya Kataoka, Shizuoka (JP); Hiroki Sumitani, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 39 days.

(21) Appl. No.: 18/750,408

(22) Filed: Jun. 21, 2024

(65) Prior Publication Data

US 2024/0336317 A1 Oct. 10, 2024

Related U.S. Application Data

(63) Continuation of application No. PCT/JP2022/044932, filed on Dec. 6, 2022.

(30) Foreign Application Priority Data

Dec. 27, 2021 (JP) ................................ 2021-212077
Dec. 27, 2021 (JP) ................................ 2021-212078
(Continued)

(51) Int. Cl.
*B62J 6/023* (2020.01)
*G06V 10/141* (2022.01)
(Continued)

(52) U.S. Cl.
CPC ............ *B62J 6/023* (2020.02); *G06V 10/141* (2022.01); *G06V 20/60* (2022.01); *H04N 23/695* (2023.01); *G06V 2201/08* (2022.01)

(58) Field of Classification Search
None
See application file for complete search history.

(56) References Cited

U.S. PATENT DOCUMENTS

2013/0218413 A1* 8/2013 Tanaka .................. B60Q 1/143 701/36
2015/0042225 A1* 2/2015 Fukayama ............ B60Q 1/143 315/82

(Continued)

FOREIGN PATENT DOCUMENTS

JP 2015064964 A 4/2015
WO 2015174208 A1 11/2015
WO 2021070783 A1 4/2021

OTHER PUBLICATIONS

Extended European Search Report issued on Feb. 10, 2025, in corresponding European Patent Application No. 22915658.3. (8 pages).

(Continued)

*Primary Examiner* — Kenneth B Wells
(74) *Attorney, Agent, or Firm* — BUCHANAN, INGERSOLL & ROONEY PC

(57) ABSTRACT

A vehicle detecting device performs a process of detecting a front vehicle using an image that is based on an imaging device provided in a vehicle, and in accordance with a change in an angle of tilt of the vehicle's right-left axis, modifies an imaging region of the imaging device so as to mitigate a shift in the imaging region caused by the change.

3 Claims, 24 Drawing Sheets

(30) Foreign Application Priority Data

| | | |
|---|---|---|
| Dec. 27, 2021 | (JP) | 2021-212079 |
| Dec. 27, 2021 | (JP) | 2021-213023 |

(51) Int. Cl.

| | |
|---|---|
| ***G06V 20/60*** | (2022.01) |
| ***H04N 23/695*** | (2023.01) |

(56) References Cited

U.S. PATENT DOCUMENTS

| | | | |
|---|---|---|---|
| 2015/0085514 | A1 | 3/2015 | Yagi |
| 2017/0154224 | A1 | 6/2017 | Torii |
| 2018/0218229 | A1 | 8/2018 | Murillo Amaya et al. |
| 2022/0227285 | A1 | 7/2022 | Arai et al. |
| 2025/0249822 | A1* | 8/2025 | Kataoka ................. G06V 10/25 |

OTHER PUBLICATIONS

International Search Report (PCT/ISA/210) and Written Opinion (PCT/ISA/237) both with English translation mailed on Jan. 31, 2023, by the Japanese Patent Office as the International Searching Authority for International Application No. PCT/JP2022/044932, 15 pages.

* cited by examiner

VEHICLE DETECTING DEVICE, LIGHT DISTRIBUTION CONTROLLING DEVICE, AND VEHICLE DETECTING METHOD

CROSS-REFERENCE TO RELATED APPLICATIONS

This application is the continuation of International Patent Application No. PCT/JP2022/044932, filed on Dec. 6, 2022, which claims the benefit of priority from Japanese Patent Application No. 2021-212077, filed on Dec. 27, 2021, Japanese Patent Application No. 2021-212078, filed on Dec. 27, 2021, Japanese Patent Application No. 2021-212079, filed on Dec. 27, 2021, and Japanese Patent Application No. 2021-213023, filed on Dec. 27, 2021, the entire content of each of which is incorporated herein by reference.

BACKGROUND

Field of the Invention

The present invention relates to vehicle detecting devices, light distribution controlling devices, and vehicle detecting methods.

Description of the Related Art

Adaptive driving beam (ADB) control is proposed that dynamically and adaptively controls light distribution patterns based on the circumstances surrounding the vehicle. ADB control detects, with a camera, the presence of a front vehicle that should not be illuminated with high-illuminance light and blocks the region of light that corresponds to the front vehicle (see, for example, Patent Literature 1). Blocking the region of light that corresponds to the front vehicle can reduce glare caused on the driver of the front vehicle and can also improve the visibility of the driver of the host vehicle.

Patent Literature 1: JP 2015-064964

In implementation of ADB control, front vehicles should desirably be detected with high accuracy. The present inventors have conducted diligent investigations into the techniques for detecting front vehicles and found that the accuracy of detecting front vehicles can decrease when the host vehicle become tilted.

SUMMARY OF THE INVENTION

The present invention has been made in the light of such circumstances and is, in one aspect, directed to providing a technique for increasing the accuracy of detecting a front vehicle.

1. To address the aforementioned issue, one aspect of the present invention provides a vehicle detecting device. This vehicle detecting device performs a process of detecting a front vehicle using an image that is based on an imaging device provided in a vehicle, and in accordance with a change in an angle of tilt of the vehicle's right-left axis, modifies an imaging region of the imaging device so as to mitigate a shift in the imaging region caused by the change.

Another aspect of the present invention provides a light distribution controlling device. This light distribution controlling device, based on a detection result of the vehicle detecting device of the aspect above, sets a light distribution pattern that includes a shaded region to overlap the front vehicle.

Yet another aspect of the present invention provides a vehicle detecting method. This vehicle detecting method includes performing a process of detecting a front vehicle using an image that is based on an imaging device provided in a vehicle, and in accordance with a change in an angle of tilt of the vehicle's right-left axis, modifying an imaging region of the imaging device so as to mitigate a shift in the imaging region caused by the change.

2. To address the aforementioned issue, one aspect of the present invention provides a vehicle detecting device. This vehicle detecting device sets a processing region in an image that is based on an imaging device provided in a vehicle, performs a process of detecting a front vehicle from the processing region, and in accordance with a change in an angle of tilt of the vehicle's right-left axis, modifies the processing region so as to mitigate a shift in the processing region caused by the change.

Another aspect of the present invention provides a light distribution controlling device. This light distribution controlling device, based on a detection result of the vehicle detecting device of the aspect above, sets a light distribution pattern that includes a shaded region to overlap the front vehicle.

Yet another aspect of the present invention provides a vehicle detecting method. This vehicle detecting method includes setting a processing region in an image that is based on an imaging device provided in a vehicle, performing a process of detecting a front vehicle from the processing region, and in accordance with a change in an angle of tilt of the vehicle's right-left axis, modifying the processing region so as to mitigate a shift in the processing region caused by the change.

3. To address the aforementioned issue, one aspect of the present invention provides a vehicle detecting device. This vehicle detecting device, using a structuring element of a predetermined shape, performs a dilation process on a luminous point included in an image that is based on an imaging device provided in a vehicle; when there is another dilated luminous point to be coupled to the dilated luminous point, detects a front vehicle based on the two luminous points; and in accordance with a change in an angle of tilt of the vehicle's right-left axis, modifies the structuring element so as to absorb an offset between the luminous points in the image caused by the change.

Another aspect of the present invention provides a light distribution controlling device. This light distribution controlling device, based on a detection result of the vehicle detecting device of the aspect above, sets a light distribution pattern that includes a shaded region to overlap the front vehicle.

Yet another aspect of the present invention provides a vehicle detecting method. This vehicle detecting method includes, by using a structuring element of a predetermined shape, performing a dilation process on a luminous point included in an image that is based on an imaging device provided in a vehicle; when there is another dilated luminous point to be coupled to the dilated luminous point, detecting a front vehicle based on the two luminous points; and in accordance with a change in an angle of tilt of the vehicle's right-left axis, modifying the structuring element so as to absorb an offset between the luminous points in the image caused by the change.

4. To address the aforementioned issue, one aspect of the present invention provides a vehicle detecting device. This vehicle detecting device, when two luminous points included in an image that is based on an imaging device provided in a vehicle satisfy a predetermined pair determining condition, detects a front vehicle based on the two luminous points, and in accordance with a change in an angle of tilt of the vehicle's right-left axis, relaxes the pair determining condition so as to absorb an offset between the luminous points in the image caused by the change.

Another aspect of the present invention provides a light distribution controlling device. This light distribution controlling device, based on a detection result of the vehicle detecting device of the aspect above, sets a light distribution pattern that includes a shaded region to overlap the front vehicle.

Yet another aspect of the present invention provides a vehicle detecting method. This vehicle detecting method includes, when two luminous points included in an image that is based on an imaging device provided in a vehicle satisfy a predetermined pair determining condition, detecting a front vehicle based on the two luminous points, and in accordance with a change in an angle of tilt of the vehicle's right-left axis, relaxing the pair determining condition so as to absorb an offset between the luminous points in the image caused by the change.

It is to be noted that any combinations of the constituent elements above or an embodiment obtained by converting what is expressed by the present invention between a method, an apparatus, a system, and so forth is also effective as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
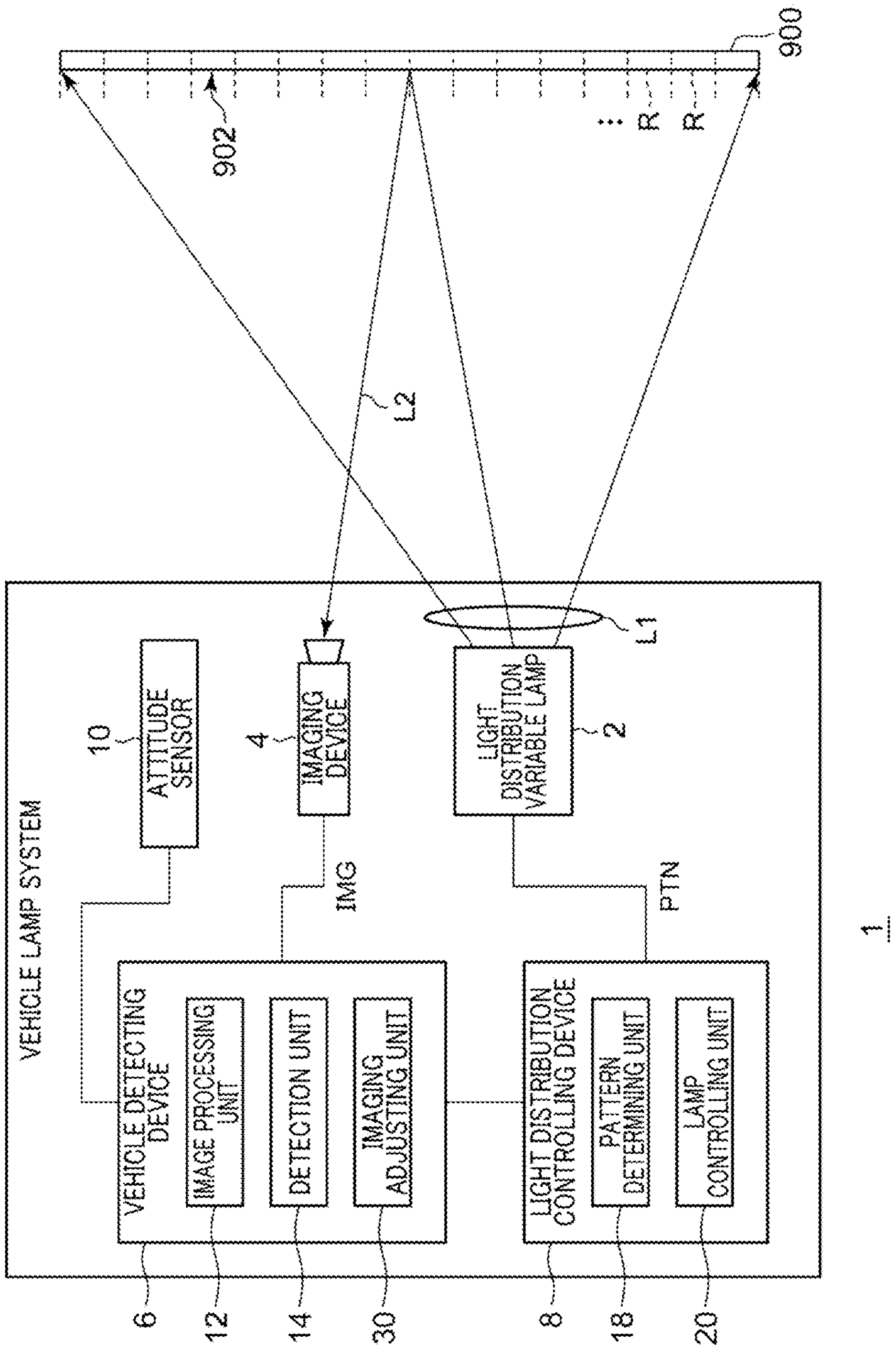
FIG. 1 is a block diagram of a vehicle lamp system according to Embodiment 1.

Hereinafter, the present invention will be described based on some preferred embodiments and with reference to the drawings. The embodiments are illustrative in nature and are not intended to limit the invention. Not all the features and combinations thereof described according to the embodiments are necessarily essential to the invention. Identical or equivalent constituent elements, members, and processes illustrated in the drawings are given identical reference characters, and their duplicate description will be omitted as appropriate.

The scales and shapes of the components illustrated in the drawings are set merely for convenience in order to facilitate description and are not to be interpreted as limiting, unless specifically indicated otherwise. When terms such as "first" and "second" are used in the present specification or in the claims, these terms do not indicate the order or the levels of importance in any way and are merely used to distinguish one component from another component, unless specifically indicated otherwise. One or more of the members that are not important in describing the embodiments are omitted from the drawings.

Embodiment 1

FIG. 1 is a block diagram of a vehicle lamp system 1. FIG. 1 depicts constituent elements of the vehicle lamp system 1 in the form of functional blocks. These functional blocks are implemented, as to their hardware configuration, by elements or circuits, such as a CPU or memory of a computer, or implemented, as to their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, a vehicle detecting device 6, a light distribution controlling device 8, and an attitude sensor 10. These components are provided in a vehicle. A vehicle in which the vehicle lamp system 1 is provided according to the present embodiment is a straddle-type vehicle, such as a motorcycle. The light distribution variable lamp 2, the imaging device 4, the vehicle detecting device 6, the light distribution controlling device 8, and the attitude sensor 10 may all be contained within a single housing, or some of these members may be provided outside such a housing.

For example, the light distribution variable lamp 2, the imaging device 4, the vehicle detecting device 6, the light distribution controlling device 8, and the attitude sensor 10 are housed in a lamp room. The lamp room is defined by a lamp body having an opening that opens to the front side of the vehicle and a light-transmissive cover attached so as to cover the opening of the lamp body. The imaging device 4, the vehicle detecting device 6, the light distribution controlling device 8, and the attitude sensor 10 may be provided outside the lamp room, such as in the vehicle. In this case, the imaging device 4 may be an onboard camera. The vehicle detecting device 6 and the light distribution controlling device 8 may be, for example, entirely or partly constituted by a vehicle ECU. An imaging adjusting unit 30 and so forth, described later, of the vehicle detecting device 6 may be embedded in the imaging device 4.

The light distribution variable lamp 2 is capable of illuminating a region ahead of the host vehicle with a visible light beam L1 of a variable intensity distribution. The light distribution variable lamp 2 is enabled to vary the illuminance of light in a plurality of illuminated individual regions R arrayed ahead of the vehicle independently of each other. The plurality of individual regions R are arrayed, for example, in a matrix. The light distribution variable lamp 2 receives information instructing on a light distribution pattern PTN from the light distribution controlling device 8 and emits a visible light beam L1 having an intensity distribution corresponding to the light distribution pattern PTN. Thus, the light distribution pattern PTN is formed ahead of the host vehicle. A light distribution pattern PTN can be understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the space ahead of the host vehicle with light from a light source. In an alternative configuration, illumination of light directed to the region ahead of the host vehicle may be blocked partly by a shading plate.

The imaging device 4 has a sensitivity to a visible light range and repeatedly captures an image of the region ahead of the host vehicle. The imaging device 4 captures an image of reflected light L2 of a visible light beam L1 reflected from an object located ahead of the vehicle. The imaging device 4 also captures an image of light from a front vehicle, including a leading vehicle and an oncoming vehicle. An image IMG that the imaging device 4 generates is sent to the vehicle detecting device 6.

An image IMG that the vehicle detecting device 6 acquires from the imaging device 4 may be RAW image data or image data subjected to predetermined image processing by the imaging device 4. When the vehicle detecting device 6 receives image data resulting from subjecting RAW image data generated by the imaging device 4 to image processing performed by a processing device other than the imaging device 4, this receiving also corresponds to the acquiring of an image IMG from the imaging device 4. In the following description, "an image IMG that is based on the imaging device 4" may mean either of RAW image data and data subjected to image processing. Furthermore, the expression "image IMG" may be used without any distinction between the two types of image data.

The vehicle detecting device 6 detects a front vehicle using an image IMG that is based on the imaging device 4. The vehicle detecting device 6 sends its detection result to the light distribution controlling device 8. Herein, the vehicle detecting device 6 may detect a target aside from a front vehicle. The vehicle detecting device 6 can be constituted by a digital processor, and for example, the vehicle detecting device 6 may be constituted by a combination of a microcomputer including a CPU and a software program or by a field programmable gate array (FPGA), an application specific IC (ASIC), or the like. The vehicle detecting device 6 includes, in one example, an image processing unit 12, a detection unit 14, and an imaging adjusting unit 30. Each of these units operates as an integrated circuit constituting itself and executes a program stored in a memory. An operation of each of these units will be described later.

The light distribution controlling device 8 executes ADB control by dynamically and adaptively controlling the light distribution of the light distribution variable lamp 2 in accordance with a target present in the region ahead. The light distribution controlling device 8 according to the present embodiment sets a light distribution pattern PTN that includes a shaded region to overlap a front vehicle, based on a detection result of the vehicle detecting device 6. The light distribution controlling device 8 sends information instructing on a light distribution pattern PTN to the light distribution variable lamp 2. The light distribution controlling device 8 can be constituted by a digital processor, and for example, the light distribution controlling device 8 may be constituted by a combination of a microcomputer including a CPU and a software program or by a field programmable gate array (FPGA), an application specific IC (ASIC), or the like. The light distribution controlling device 8 includes, in one example, a pattern determining unit 18 and a lamp controlling unit 20. Each of these units operates as an integrated circuit constituting itself and executes a program stored in a memory. An operation of each of these units will be described later.

The attitude sensor 10 measures the tilt of the host vehicle in the right-left direction. That is, the attitude sensor 10 measures the angle of tilt of the vehicle's right-left axis with respect to a horizontal line or a vertical line (in other words, the angle of tilt of the vehicle's up-down axis with respect to a horizontal line or a vertical line). The attitude sensor 10 is constituted, for example but not limited to, by a known inertial measurement unit (IMU). The attitude sensor 10 sends its measurement result to the vehicle detecting device 6.

Figure 2A:
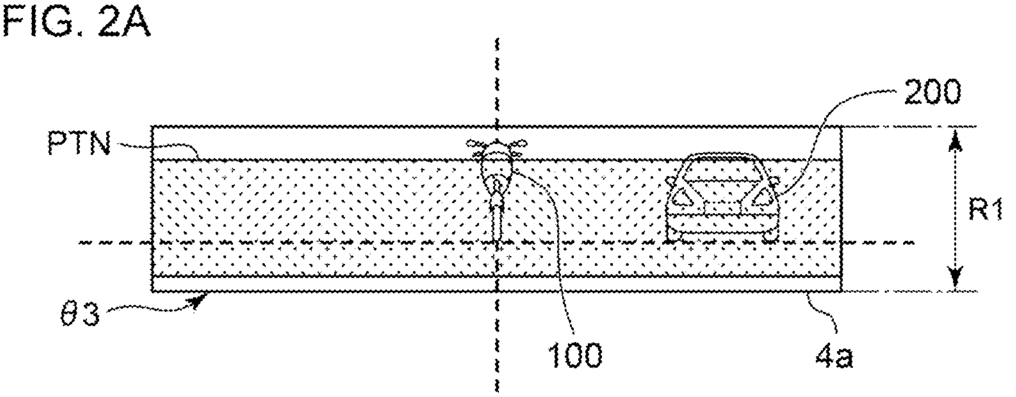
FIGS. 2A, 2B, and 2C are illustrations for describing a basic operation of vehicle detection and light distribution control.
Figure 2B:
Figure 2C:
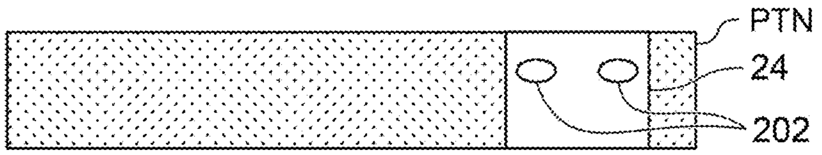

Next, an operation of the vehicle detecting device 6 and of the light distribution controlling device 8 will be described. FIGS. 2A, 2B, and 2C are illustrations for describing a basic operation of vehicle detection and light distribution control. FIG. 2A shows a host vehicle 100, an imaging region 4*a* of the imaging device 4, and a light distribution pattern PTN formed in the region ahead of the host vehicle 100. In this example, a high beam light distribution pattern is shown as one example of the light distribution pattern PTN.

When a front vehicle 200 is in the imaging region 4*a* of the imaging device 4, an image IMG that includes the front vehicle 200 is generated by the imaging device 4 and sent to the vehicle detecting device 6. The imaging region 4*a*, of the imaging device 4, used for vehicle detection or light distribution control, that is, a sensing region of the imaging device 4 is typically set larger in the right-left direction of the host vehicle 100 than in its up-down direction. This is because the range in which a front vehicle 200 to be detected appears or the shape of a light distribution pattern PTN is larger in the right-left direction than in the up-down direction. Herein, the imaging region 4*a* covers a range smaller than the maximum imageable range of the imaging device 4.

The image IMG sent to the vehicle detecting device 6 is acquired by the image processing unit 12. The image processing unit 12 performs known image processing, such as binarization, on the image IMG. This image processing generates a luminous point image IMGa in which two luminous points 202 corresponding to lamps of the front vehicle 200 are extracted, as shown in FIG. 2B. The lamps of the front vehicle 200 are rear lamps or the like if the front vehicle 200 is a leading vehicle, or they are headlamps or the like if the front vehicle 200 is an oncoming vehicle. A rear lamp includes a stop lamp and a tail lamp. The image processing unit 12 sends the generated luminous point image IMGa to the detection unit 14.

The detection unit 14 determines the presence of a front vehicle 200 using a luminous point image IMGa. When a luminous point image IMGa includes luminous points 202, the detection unit 14 detects a front vehicle 200 based on these luminous points 202. For example, the detection unit 14 compares luminous points 202 against a known pair determining condition, and when having identified two luminous points 202 that satisfy the pair determining condition, the detection unit 14 determines these two luminous points 202 as a front vehicle 200. The detection unit 14 sends its detection result to the light distribution controlling device 8. Herein, there is no particular limitation on the vehicle detecting method that the detection unit 14 performs. For example, without generating a luminous point image IMGa, the detection unit 14 may detect a front vehicle 200 directly from an image IMG using a known method including, for example, algorithm recognition or deep learning.

The detection result sent to the light distribution controlling device 8 is acquired by the pattern determining unit 18. When a front vehicle 200 is detected, the pattern determining unit 18 sets a shaded region 24 to overlap the front vehicle 200 in a light distribution pattern that serves as a base, as shown in FIG. 2C. Thus, a light distribution pattern PTN to be formed is determined. A shaded region 24 is a portion of a light distribution pattern PTN where the luminance (illuminance) is zero or a portion of a light distribution pattern PTN where the luminance is reduced to higher than zero but lower than that held prior to shading. When no front vehicle 200 is detected, the pattern determining unit 18 sets a light distribution pattern PTN that does not include a shaded region 24.

A light distribution pattern that serves as a base is selected in accordance with a light distribution mode that is set based, for example, on the driver's instruction input by operating the light switch (not shown), the traveling state of the host vehicle, or the environment surrounding the host vehicle. For example, light distribution modes include, for example, a high beam mode of forming a high beam light distribution pattern, a low beam mode of forming a low beam light distribution pattern, and a town mode of forming a light distribution pattern suitable for traveling in a city area. FIG. 2C shows a high beam light distribution pattern as one example. The pattern determining unit 18 sends information about the determined light distribution pattern PTN to the lamp controlling unit 20.

The lamp controlling unit 20 instructs the light distribution variable lamp 2 to form the light distribution pattern PTN. The lamp controlling unit 20 is constituted, for example, by a known LED driver module (LDM). If the light sources of the light distribution variable lamp 2 are controlled by analog dimming, the lamp controlling unit 20 adjusts the direct current level of the driving current flowing in the light sources. Meanwhile, if the light sources are controlled by pulse width modulation (PWM) dimming, the lamp controlling unit 20 adjusts the mean level of the driving current by switching the current that flows in the light sources to adjust the ratio of the on periods. If the light distribution variable lamp 2 includes a DMD, the lamp controlling unit 20 may control the on/off switching of each mirror element constituting the DMD. If the lamp controlling unit 20 includes a liquid-crystal device, the lamp controlling unit 20 may control the optical transmittance of the liquid-crystal device. Thus, the light distribution pattern PTN is formed ahead of the host vehicle.

Figure 3A:
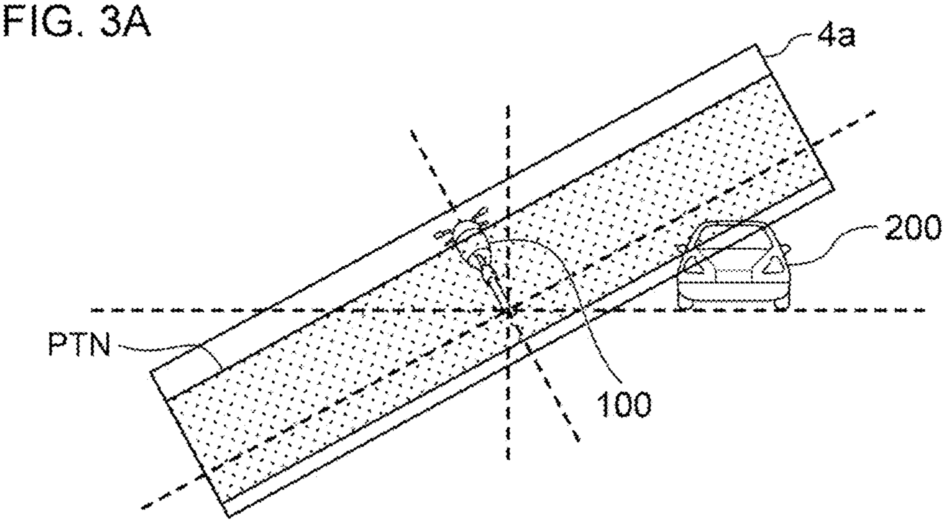
FIGS. 3A, 3B, and 3C are illustrations for describing a case in which the basic operation is performed while a host vehicle is tilted sideways.
Figure 3B:
Figure 3C:
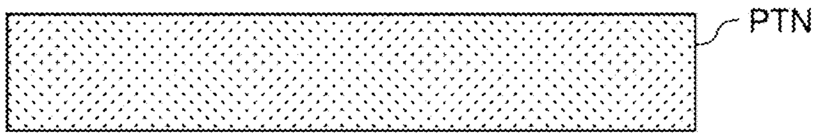

Next, how an imaging region 4*a* is adjusted when a host vehicle 100 becomes tilted sideways will be described. FIGS. 3A, 3B, and 3C are illustrations for describing a case in which the basic operation is performed while the host vehicle is tilted sideways. As described above, the vehicle detecting device 6 detects a front vehicle 200 using an imaging region 4*a* that is large in the right-left direction and small in the up-down direction. In this control, when the attitude of the host vehicle 100 becomes tilted in the right-left direction, this can create a situation in which a front vehicle 200 cannot be detected. Specifically, when the host vehicle 100 becomes tilted sideways as shown in FIG. 3A, the imaging region 4*a* of the imaging device 4 provided in the host vehicle 100 also becomes tilted sideways. In particular, if the host vehicle 100 is a straddle-type vehicle, the host vehicle 100 banks greatly to the right and left when traveling on a curved road. Therefore, the imaging region 4*a* tends to tilt greatly as well.

An image IMG obtained when the imaging region 4*a* is tilted is an image that is tilted with respect to the ground surface. With an image IMG tilted with respected to the ground surface, a lamp or lamps of a front vehicle 200 may lie outside the image IMG. Therefore, as to a luminous point image IMGa obtained from such an image IMG, a luminous point image IMGa that fails to include a luminous point 202 can be generated, as shown in FIG. 3B. Vehicle detection performed with the use of such a luminous point image IMGa cannot detect a front vehicle 200 even when the front vehicle 200 is actually present. As a result, a light distribution pattern PTN that includes no shaded region 24 is set, as shown in FIG. 3C. Herein, even in a case in which a front vehicle 200 is to be detected without the use of luminous points 202, a front vehicle 200 may lie outside an image IMG when the imaging device 4 becomes tilted, and the front vehicle 200 may fail to be detected.

Accordingly, the vehicle detecting device 6 according to the present embodiment, in accordance with a change in the angle of tilt (bank angle) of the vehicle's right-left axis relative to a horizontal line, modifies the imaging region 4*a* so as to mitigate a shift in the imaging region 4*a* caused by the change.

Specifically, the measurement result sent from the attitude sensor 10 to the vehicle detecting device 6 is acquired by the imaging adjusting unit 30. Based on the acquired measurement result, the imaging adjusting unit 30 can detect a change in the angle of tilt of the host vehicle 100. In response to detecting a change in the angle of tilt of the host vehicle 100, the imaging adjusting unit 30 modifies the imaging region 4*a* so as to mitigate a shift in the imaging region 4*a* with respect to the region ahead. In other words, with the portion of the region ahead that overlaps the imaging region 4*a* when the host vehicle 100 is not tilted set as a reference portion, the imaging adjusting unit 30 modifies the imaging region 4*a* so that the overlap (the area) between the reference portion and the imaging region 4*a* held when the host vehicle 100 is tilted becomes larger than when such an adjustment is not made to the imaging region 4*a*. This adjustment makes a front vehicle 200 more likely to be included in the imaging region 4*a* even when the host vehicle 100 becomes tilted.

Figure 4A:
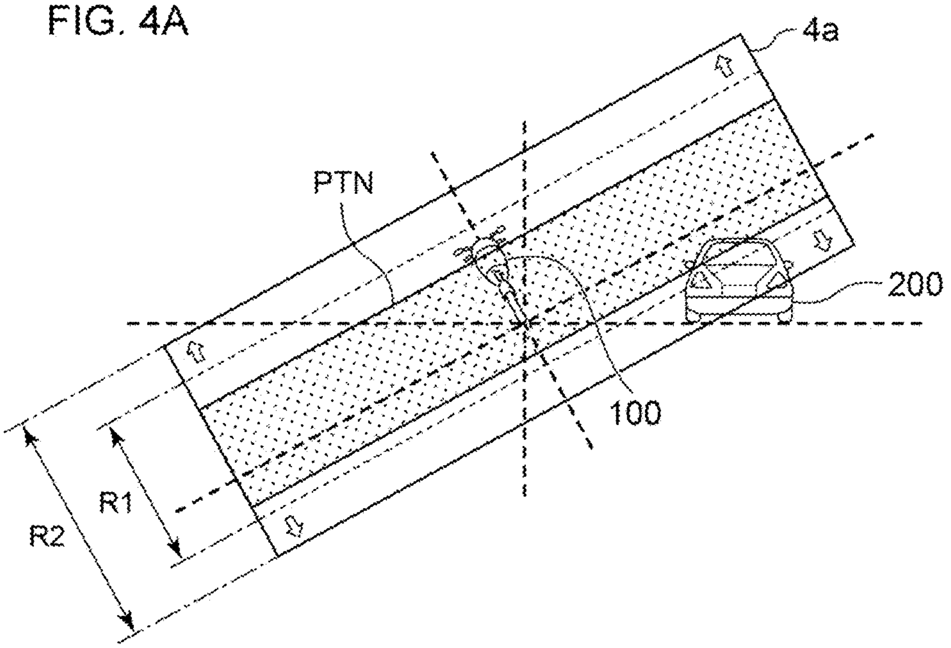
FIGS. 4A, 4B, and 4C are illustrations for describing how a region range of an imaging region is adjusted.
Figure 4B:
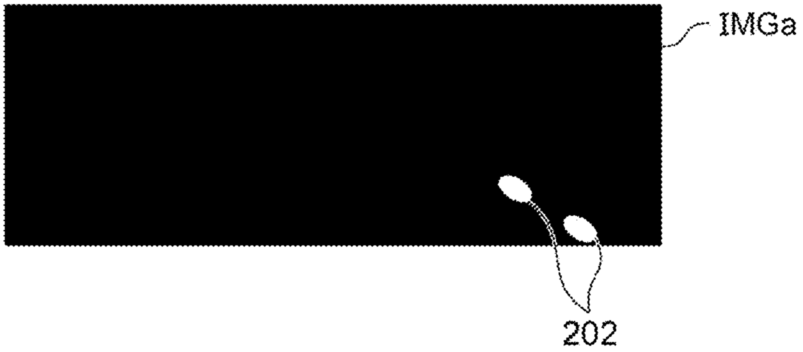
Figure 4C:
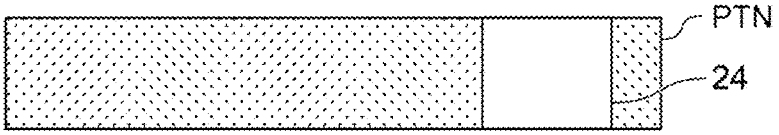

The imaging adjusting unit 30 modifies at least one of a region range of the imaging region 4*a* in the up-down direction of the vehicle or a region angle of the imaging region 4*a*. First, a case in which the imaging adjusting unit 30 modifies the region range of the imaging region 4*a* will be described. FIGS. 4A, 4B, and 4C are illustrations for describing how the region range of the imaging region 4*a* is adjusted. When the angle of tilt of the right-left axis of the host vehicle 100 is a first angle with respect to a horizontal line, the region range of the imaging region 4*a* in the up-down direction of the vehicle is a first range R1. For example, the imaging region 4*a* of the first range R1 is held by default in the vehicle detecting device 6. When the host vehicle 100 is substantially not tilted, that is, when the angle of tilt of the vehicle's right-left axis is about 0 degrees (first angle≈0 degrees), the vehicle detecting device 6 detects a front vehicle 200 using the imaging region 4*a* of the first range R1, as shown in FIGS. 2A to 2C.

When the host vehicle 100 becomes tilted sideways and the angle of tilt of its right-left axis becomes a second angle greater than the first angle with respect to a horizontal line, the imaging adjusting unit 30 sets the region range in the up-down direction of the vehicle to a second range R2 greater than the first range R1, as shown in FIG. 4A. The imaging region 4*a* according to the present embodiment is rectangular with the upper and lower sides extending in the right-left direction of the vehicle and the left and right sides extending in the up-down direction. The imaging adjusting unit 30 displaces the upper side of the imaging region 4*a* upward or displaces the lower side downward, or performs both of these displacing operations. Preferably, the adjustment of the region range includes displacing the lower side of the imaging region 4*a*.

For example, the imaging adjusting unit 30 holds, in advance, a threshold of the angle of tilt of the vehicle's right-left axis, and when the angle of tilt of the host vehicle 100 has exceeded the threshold, the imaging adjusting unit 30 expands the region range of the imaging region 4*a* from the first range R1 to the second range R2. This threshold can be set as appropriate based on an experiment or simulation conducted by an engineer. Expanding the range of the imaging region 4*a* in the up-down direction from the first range R1 to the second range R2 corresponds to the mitigating of a shift in the imaging region 4*a*. Herein, as long as either at least a portion of the upper side of the imaging region 4*a* is expanded upward or at least a portion of the lower side of the imaging region 4*a* is expanded downward, such expanding corresponds to the shift mitigation.

As the imaging region 4*a* is expanded from the first range R1 to the second range R2, even when the host vehicle 100 becomes tilted sideways, a front vehicle 200 lying outside the imaging region 4*a* can be suppressed. Accordingly, it becomes more likely that a luminous point image IMGa includes two luminous points 202 corresponding to lamps of a front vehicle 200, as shown in FIG. 4B. Hence, even when the host vehicle 100 becomes tilted sideways, a front vehicle 200 can be detected with high accuracy. As a result, a light distribution pattern PTN that includes a shaded region 24 to overlap a front vehicle 200 can be formed ahead of the host vehicle, as shown in FIG. 4C.

Herein, when the host vehicle 100 is tilted at a first angle greater than 0 degrees, vehicle detection may be performed with the use of the imaging region 4*a* of the first range R1, and when the host vehicle 100 becomes further tilted at a second angle greater than the first angle, vehicle detection may be performed with the use of the imaging region 4*a* of the second range R2. Furthermore, the imaging adjusting unit 30 may modify the region range in the up-down direction continuously or stepwise including three or more steps, in accordance with a change in the angle of tilt of the vehicle's right-left axis. In other words, the region range may be increased as the angle of tilt of the host vehicle 100 increases.

Figure 5A:
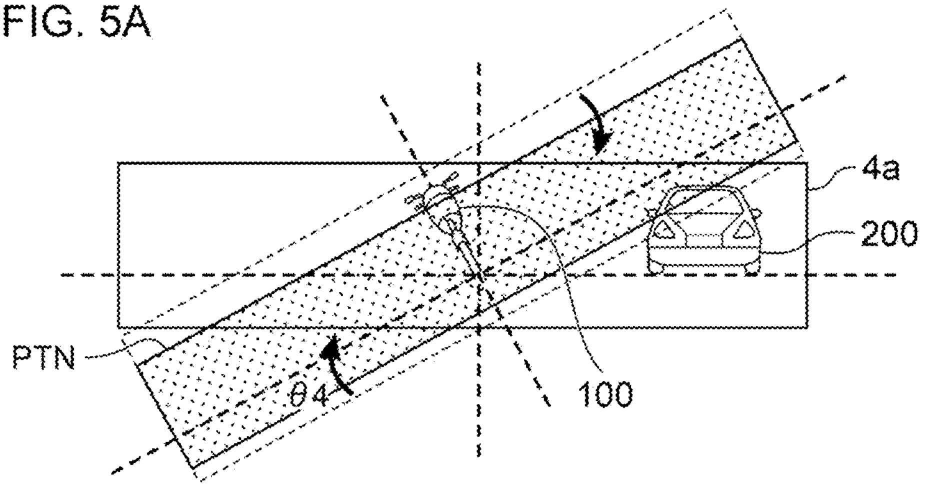
FIGS. 5A, 5B, and 5C are illustrations for describing how a region angle of an imaging region is adjusted.
Figure 5B:
Figure 5C:
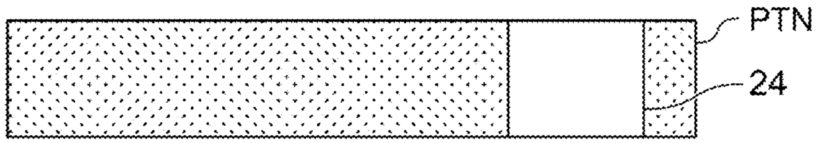

Next, a case in which the imaging adjusting unit 30 modifies the region angle of the imaging region 4*a* will be described. FIGS. 5A, 5B, and 5C are illustrations for describing how the region angle of the imaging region 4*a* is adjusted. The region angle of the imaging region 4*a* is the angle about the vehicle's front-rear axis or the angle about the imaging axis of the imaging device 4. Furthermore, the region angle is the angle relative to the vehicle's right-left axis, that is, for example, the angle formed by the upper side or lower side of the imaging region 4*a* and the vehicle's right-left axis.

When the angle of tilt of the right-left axis of the host vehicle 100 is a first angle with respect to a horizontal line, the region angle of the imaging region 4*a* is a third angle θ3. For example, the imaging region 4*a* of the third angle θ3 is held by default in the vehicle detecting device 6. When the host vehicle 100 is substantially not tilted, that is, when the angle of tilt of the vehicle's right-left axis is about 0 degrees (first angle≈0 degrees), the vehicle detecting device 6 detects a front vehicle 200 using the imaging region 4*a* of the third angle θ3 (θ3≈0 degrees), as shown in FIGS. 2A to 2C.

When the host vehicle 100 becomes tilted sideways and the angle of tilt of its right-left axis becomes a second angle greater than the first angle with respect to a horizontal line, the imaging adjusting unit 30 sets the region angle of the imaging region 4*a* to a fourth angle θ4 greater than the third angle θ3, as shown in FIG. 5A. The pivoting direction of the imaging region 4*a* is opposite the direction in which the host vehicle 100 tilts. In other words, when the host vehicle 100 is tilted to the left as shown in FIG. 5A, the imaging region 4*a* is tilted to the right (i.e., pivoted clockwise). Meanwhile, when the host vehicle 100 is tilted to the right, the imaging region 4*a* is tilted to the left (i.e., pivoted counterclockwise). The region angle of the imaging region 4*a* can be adjusted through signal processing, as the imaging adjusting unit 30 instructs the processor of the imaging device 4. Alternatively, when the imaging device 4 is supported by a bracket so as to be rotatable about its imaging axis, the region angle of the imaging region 4*a* can be adjusted physically by the imaging adjusting unit 30 causing the imaging device 4 to rotate.

For example, the imaging adjusting unit 30 holds, in advance, a threshold of the angle of tilt of the vehicle's right-left axis, and when the angle of tilt of the host vehicle 100 has exceeded the threshold, the imaging adjusting unit 30 modifies the region angle of the imaging region 4*a* from the third angle θ3 to the fourth angle θ4. This threshold can be set as appropriate based on an experiment or simulation conducted by an engineer. Increasing the angle of the imaging region 4*a* with respect to the vehicle's right-left axis from the third angle θ3 to the fourth angle θ4 corresponds to the mitigating of a shift in the imaging region 4*a*. Herein, as long as the angle of at least a portion of the imaging region 4*a* is modified, such modifying corresponds to the shift mitigation.

As the imaging region 4*a* is tilted from the third angle θ3 to the fourth angle θ4 with respect to the vehicle's right-left axis, even when the host vehicle 100 becomes tilted sideways, a front vehicle 200 lying outside the imaging region 4*a* can be suppressed. Accordingly, it becomes more likely that a luminous point image IMGa includes two luminous points 202 corresponding to lamps of a front vehicle 200, as shown in FIG. 5B. Hence, even when the host vehicle 100 becomes tilted sideways, a front vehicle 200 can be detected with high accuracy. As a result, a light distribution pattern PTN that includes a shaded region 24 to overlap a front vehicle 200 can be formed ahead of the host vehicle, as shown in FIG. 5C.

Herein, when the host vehicle 100 is tilted at a first angle greater than 0 degrees, vehicle detection may be performed with the use of the imaging region 4*a* of the third angle θ3, and when the host vehicle 100 becomes further tilted at a second angle greater than the first angle, vehicle detection may be performed with the use of the imaging region 4*a* of the fourth angle θ4. Furthermore, the imaging adjusting unit 30 may modify the region angle continuously or stepwise including three or more steps, in accordance with a change in the angle of tilt of the vehicle's right-left axis. In other words, the region angle may be increased as the angle of tilt of the host vehicle 100 increases.

The imaging adjusting unit 30 may modify both the region range and the region angle of the imaging region 4*a*. This can further reduce the likelihood that a front vehicle 200 lies outside the imaging region 4*a* due to the tilting of the host vehicle 100. Accordingly, a front vehicle 200 can be detected with higher accuracy.

Figure 6:
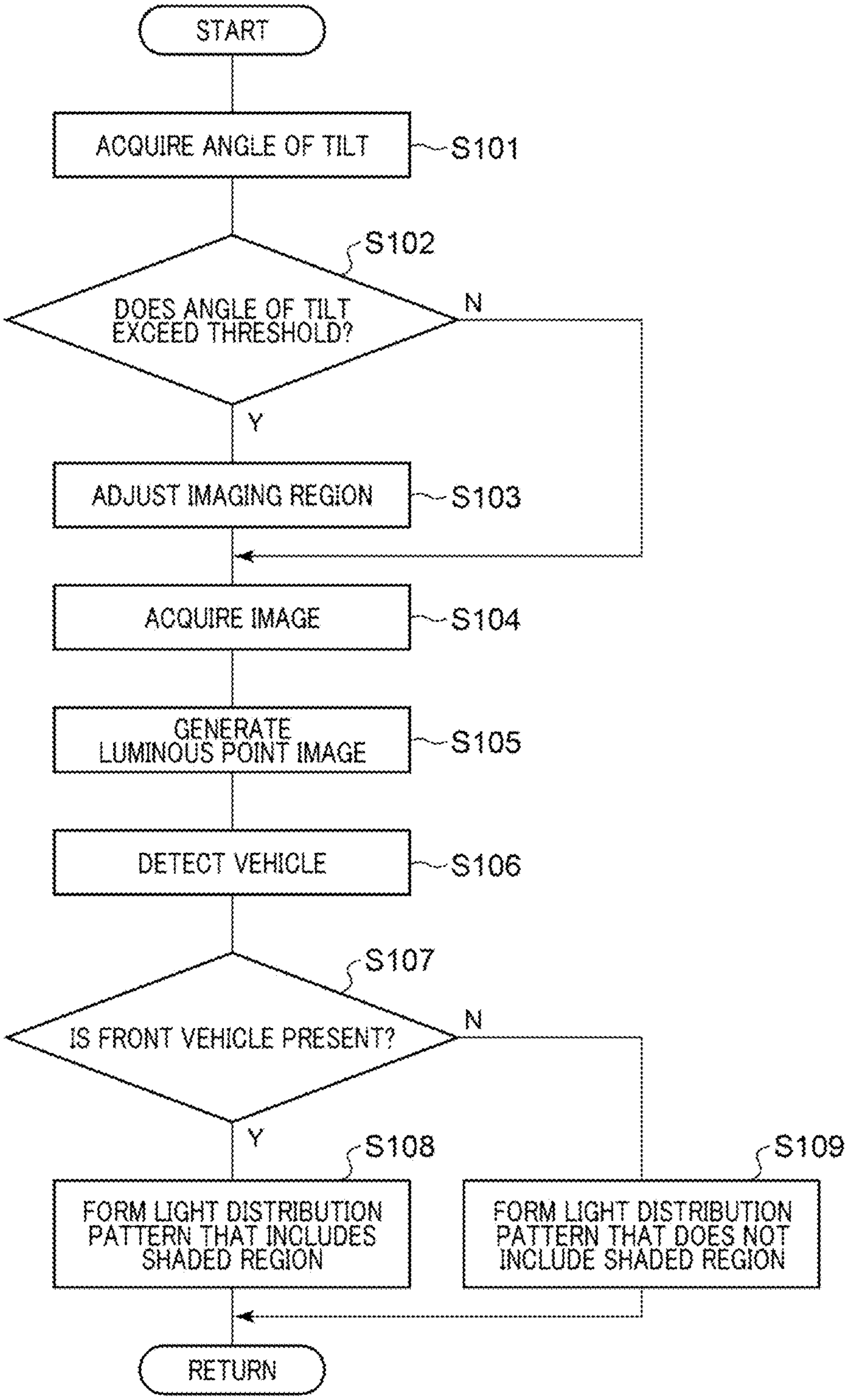
FIG. 6 is a flowchart for describing one example of control executed by a vehicle detecting device and a light distribution controlling device.

FIG. 6 is a flowchart for describing one example of control executed by the vehicle detecting device 6 and the light distribution controlling device 8. This flow is executed repeatedly at predetermined timings, for example, when the execution of ADB control is instructed via a light switch (not shown) and when the ignition is on.

First, the vehicle detecting device 6 acquires the angle of tilt of the host vehicle 100 from the attitude sensor 10 (S101). Then, the vehicle detecting device 6 determines whether the angle of tilt of the right-left axis of the host vehicle 100 is greater than a threshold (S102). If the angle of tilt is greater than the threshold (Y at S102), the vehicle detecting device 6 adjusts at least one of the region range or the region angle of the imaging region 4*a* (S013), and proceeds to step S104. If the angle of tilt is not greater than the threshold (N at S102), the vehicle detecting device 6 proceeds to step S104 without adjusting the imaging region 4*a*.

Next, the vehicle detecting device 6 acquires an image IMG from the imaging device 4 (S104). Then, the vehicle detecting device 6 generates a luminous point image IMGa from the acquired image IMG (S105). The vehicle detecting device 6 performs a vehicle detecting process using the generated luminous point image IMGa (S106). Then, the vehicle detecting device 6 determines whether a front vehicle 200 is present based on the result of the vehicle detecting process (S107). If a front vehicle 200 is present (Y at S107), the light distribution controlling device 8 controls the light distribution variable lamp 2 so as to form a light distribution pattern PTN that includes a shaded region 24 (S108), and terminates the present routine. If no front vehicle 200 is present (N at S107), the light distribution controlling device 8 controls the light distribution variable lamp 2 so as to form a light distribution pattern PTN that does not include a shaded region 24 (S109), and terminates the present routine.

As described above, the vehicle detecting device 6 according to the present embodiment performs a process of detecting a front vehicle 200 using an image IMG that is based on the imaging device 4 provided in the host vehicle 100. Furthermore, the vehicle detecting device 6, in accordance with a change in the angle of tilt of the vehicle's right-left axis with respect to a horizontal line, modifies the imaging region 4*a* so as to mitigate a shift in the imaging region 4*a* (imaging angle) of the imaging device 4 caused by the change. Adjusting the imaging region 4*a* dynamically in accordance with the tilt of the host vehicle 100 makes it possible to avoid missing a front vehicle 200. Accordingly, the accuracy of detecting a front vehicle 200 can be increased.

The vehicle detecting device 6 according to the present embodiment modifies at least one of the region range of the imaging region 4*a* in the up-down direction of the vehicle or the region angle of the imaging region 4*a*. In other words, the vehicle detecting device 6 adjusts at least one of the shape or the orientation of the imaging region 4*a*.

When modifying the region range, the vehicle detecting device 6 sets the region range to the first range R1 when the angle of tilt is the first angle and sets the region range to the second range R2 greater than the first range R1 when the angle of tilt is the second angle greater than the first angle. As the imaging region 4*a* is made relatively small when the angle of tilt of the host vehicle 100 is relatively small and the imaging region 4*a* is made relatively large when the angle of tilt is relatively large as described above, the processing load on the vehicle detecting device 6 can be reduced, as compared to the case of performing vehicle detection using an imaging region 4*a* that is large by default regardless of the angle of tilt of the host vehicle 100. Furthermore, the above can suppress erroneous determination that a luminous point 202 that is not of a front vehicle 200 is determined to have come from a front vehicle 200.

Meanwhile, when modifying the region angle, the vehicle detecting device 6 sets the region angle with respect to the vehicle's right-left axis to the third angle $\theta 3$ when the angle of tilt is the first angle and sets the region angle with respect to the vehicle's right-left axis to the fourth angle $\theta 4$ greater than the third angle $\theta 3$ when the angle of tilt is the second angle greater than the first angle. Modifying the region angle in accordance with the tilt of the host vehicle 100 while retaining the shape of the imaging region 4*a* in this manner can suppress erroneous determination.

The host vehicle 100 provided with the vehicle detecting device 6 according to the present embodiment is a straddle-type vehicle. The vehicle's right-left axis of a straddle-type vehicle tends to become tilted to a greater extent than that of a typical four-wheeled automobile. Therefore, the vehicle detecting device 6 can exhibit its functionality effectively especially in straddle-type vehicles. Herein, the host vehicle 100 may be a vehicle other than a straddle-type vehicle, such as a four-wheeled automobile.

The light distribution controlling device 8 according to the present embodiment sets a light distribution pattern PTN that includes a shaded region 24 to overlap a front vehicle 200, based on a detection result of the vehicle detecting device 6. This configuration makes it possible to achieve, with higher accuracy, both the reduction of glare caused on the driver of a front vehicle 200 and the improvement in the visibility of the driver of the host vehicle 100. Accordingly, safety in vehicle driving can be improved.

Thus far, Embodiment 1 of the present invention has been described in detail. The embodiment described above merely illustrates a specific example for implementing the present invention. The contents of the embodiment do not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiment described above, the expressions "according to the present embodiment," "in the present embodiment," and so on are added for emphasis to the content that can be subjected to such a design change as described above, but such a design change is also permitted on the content without these expressions. Any desired combination of the constituent elements described above is also valid as an aspect of the present invention. Hatching added along a section in the drawings does not limit the material of such with hatching.

The invention according to Embodiment 1 described above may be identified through the items indicated below.

[First Item]

A vehicle detecting device (6) that:

performs a process of detecting a front vehicle (200) using an image (IMG) that is based on an imaging device (4) provided in a vehicle (100); and in accordance with a change in an angle of tilt of the vehicle's right-left axis, modifies an imaging region (4*a*) of the imaging device (4) so as to mitigate a shift in the imaging region (4*a*) caused by the change.

[Second Item]

The vehicle detecting device (6) according to First Item, wherein the vehicle detecting device (6) modifies at least one of a region range of the imaging region (4*a*) in the up-down direction of the vehicle or a region angle of the imaging region (4*a*), when modifying the region range, the vehicle detecting device (6) sets the region range to a first range (R1) when the angle of tilt is a first angle, and sets the region range to a second range (R2) greater than the first range (R1) when the angle of tilt is a second angle greater than the first angle, and when modifying the region angle, the vehicle detecting device (6) sets the region angle to a third angle (03) when the angle of tilt is a first angle, and sets the region angle to a fourth angle (04) greater than the third angle (03) when the angle of tilt is a second angle greater than the first angle.

[Third Item]

The vehicle detecting device (6) according to First Item or Second Item, wherein the vehicle (100) is a straddle-type vehicle.

[Fourth Item]

A light distribution controlling device (8) that:

based on a detection result of the vehicle detecting device (6) according to any one of First Item to Third Item, sets a light distribution pattern (PTN) that includes a shaded region (24) to overlap the front vehicle (200).

[Fifth Item]

A vehicle detecting method including:

performing a process of detecting a front vehicle (200) using an image (IMG) that is based on an imaging device (4) provided in a vehicle (100); and in accordance with a change in an angle of tilt of the vehicle's right-left axis, modifying an imaging region (4*a*) of the imaging device (4) so as to mitigate a shift in the imaging region (4*a*) caused by the change.

Embodiment 2

Figure 7:
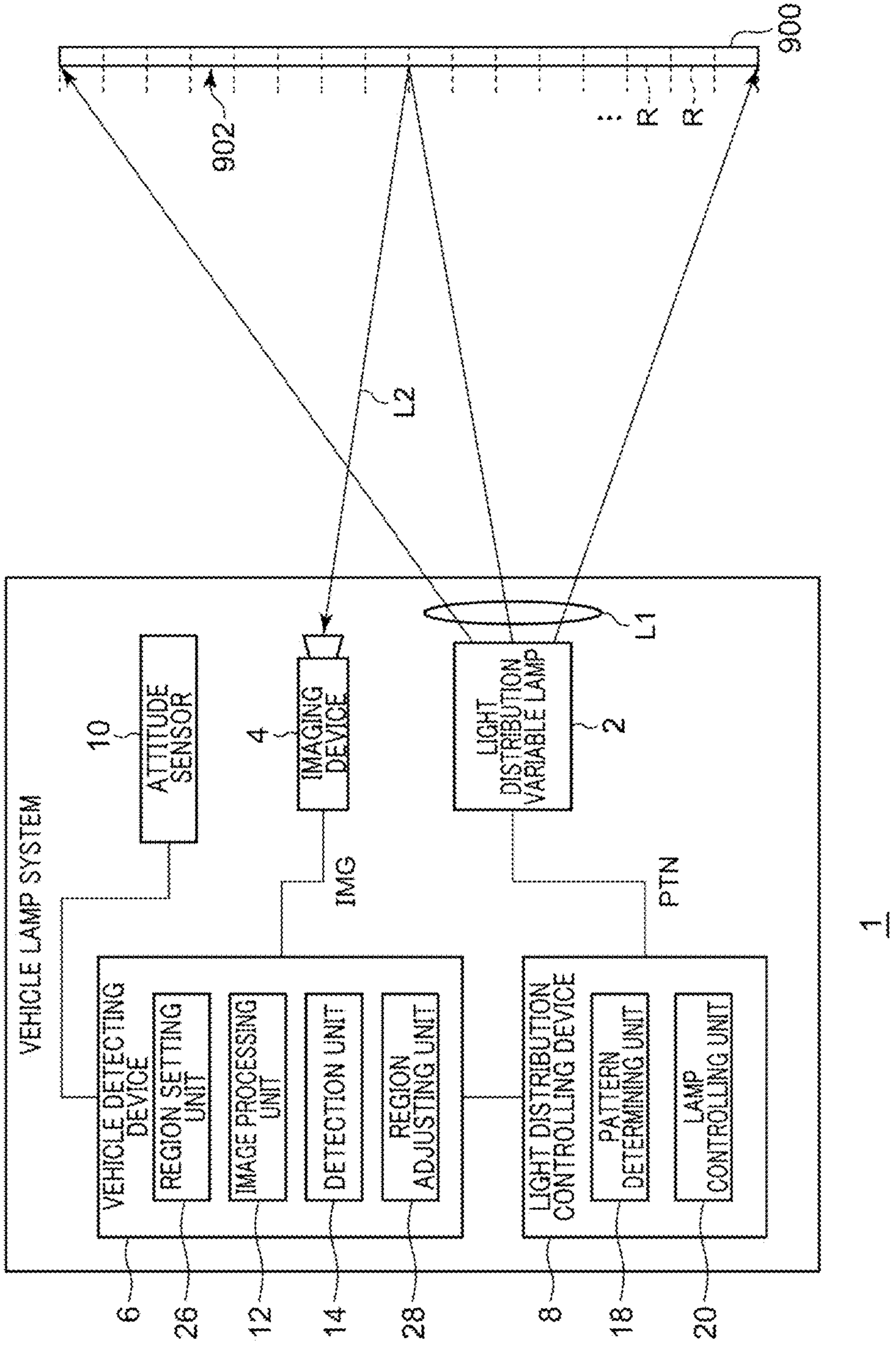
FIG. 7 is a block diagram of a vehicle lamp system according to Embodiment 2.

FIG. 7 is a block diagram of a vehicle lamp system 1. FIG. 7 depicts constituent elements of the vehicle lamp system 1 in the form of functional blocks. These functional blocks are implemented, as to their hardware configuration, by elements or circuits, such as a CPU or memory of a computer, or implemented, as to their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, a vehicle detecting device 6, a light distribution controlling device 8, and an attitude sensor 10. These components are provided in a vehicle. A vehicle in which the vehicle lamp system 1 is provided according to the present embodiment is a straddle-type vehicle, such as a motorcycle. The light distribution variable lamp 2, the imaging device 4, the vehicle detecting device 6, the light distribution controlling device 8, and the attitude sensor 10 may all be contained within a single housing, or some of these members may be provided outside such a housing.

For example, the light distribution variable lamp 2, the imaging device 4, the vehicle detecting device 6, the light distribution controlling device 8, and the attitude sensor 10 are housed in a lamp room. The lamp room is defined by a lamp body having an opening that opens to the front side of the vehicle and a light-transmissive cover attached so as to cover the opening of the lamp body. The imaging device 4, the vehicle detecting device 6, the light distribution controlling device 8, and the attitude sensor 10 may be provided outside the lamp room, such as in the vehicle. In this case, the imaging device 4 may be an onboard camera. The vehicle detecting device 6 and the light distribution controlling device 8 may be, for example, entirely or partly constituted by a vehicle ECU.

The light distribution variable lamp 2 is capable of illuminating a region ahead of the host vehicle with a visible light beam L1 of a variable intensity distribution. The light distribution variable lamp 2 is enabled to vary the illuminance of light in a plurality of illuminated individual regions R arrayed ahead of the vehicle independently of each other. The plurality of individual regions R are arrayed, for example, in a matrix. The light distribution variable lamp 2 receives information instructing on a light distribution pattern PTN from the light distribution controlling device 8 and emits a visible light beam L1 having an intensity distribution corresponding to the light distribution pattern PTN. Thus, the light distribution pattern PTN is formed ahead of the host vehicle. A light distribution pattern PTN can be understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the space ahead of the host vehicle with light from a light source. In an alternative configuration, illumination of light directed to the region ahead of the host vehicle may be blocked partly by a shading plate.

The imaging device 4 has a sensitivity to a visible light range and repeatedly captures an image of the region ahead of the host vehicle. The imaging device 4 captures an image of reflected light L2 of a visible light beam L1 reflected from an object located ahead of the vehicle. The imaging device 4 also captures an image of light from a front vehicle, including a leading vehicle and an oncoming vehicle. An image IMG that the imaging device 4 generates is sent to the vehicle detecting device 6.

An image IMG that the vehicle detecting device 6 acquires from the imaging device 4 may be RAW image data or image data subjected to predetermined image processing by the imaging device 4. When the vehicle detecting device 6 receives image data resulting from subjecting RAW image data generated by the imaging device 4 to image processing performed by a processing device other than the imaging device 4, this receiving also corresponds to the acquiring of an image IMG from the imaging device 4. In the following description, "an image IMG that is based on the imaging device 4" may mean either of RAW image data and data subjected to image processing. Furthermore, the expression "image IMG" may be used without any distinction between the two types of image data.

The vehicle detecting device 6 detects a front vehicle using an image IMG that is based on the imaging device 4. The vehicle detecting device 6 sends its detection result to the light distribution controlling device 8. Herein, the vehicle detecting device 6 may detect a target aside from a front vehicle. The vehicle detecting device 6 can be constituted by a digital processor, and for example, the vehicle detecting device 6 may be constituted by a combination of a microcomputer including a CPU and a software program or by a field programmable gate array (FPGA), an application specific IC (ASIC), or the like. The vehicle detecting device 6 includes, in one example, a region setting unit 26, an image processing unit 12, a detection unit 14, and a region adjusting unit 28. Each of these units operates as an integrated circuit constituting itself executes a program stored in a memory. An operation of each of these units will be described later.

The light distribution controlling device 8 executes ADB control of dynamically and adaptively controlling the light distribution of the light distribution variable lamp 2 in accordance with a target present in the region ahead. The light distribution controlling device 8 according to the present embodiment sets a light distribution pattern PTN that includes a shaded region to overlap a front vehicle, based on a detection result of the vehicle detecting device 6. The light distribution controlling device 8 sends information instructing on a light distribution pattern PTN to the light distribution variable lamp 2. The light distribution controlling device 8 can be constituted by a digital processor, and for example, the light distribution controlling device 8 may be constituted by a combination of a microcomputer including a CPU and a software program or by a field programmable gate array (FPGA), an application specific IC (ASIC), or the like. The light distribution controlling device 8 includes, in one example, a pattern determining unit 18 and a lamp controlling unit 20. Each of these units operates as an integrated circuit constituting itself executes a program stored in a memory. An operation of each of these units will be described later.

The attitude sensor 10 measures the tilt of the host vehicle in the right-left direction. That is, the attitude sensor 10 measures the angle of tilt of the vehicle's right-left axis with respect to a horizontal line or a vertical line (in other words, the angle of tilt of the vehicle's up-down axis with respect to a horizontal line or a vertical line). The attitude sensor 10 is constituted, for example but not limited to, by a known inertial measurement unit (IMU). The attitude sensor 10 sends its measurement result to the vehicle detecting device 6.

Figure 8A:
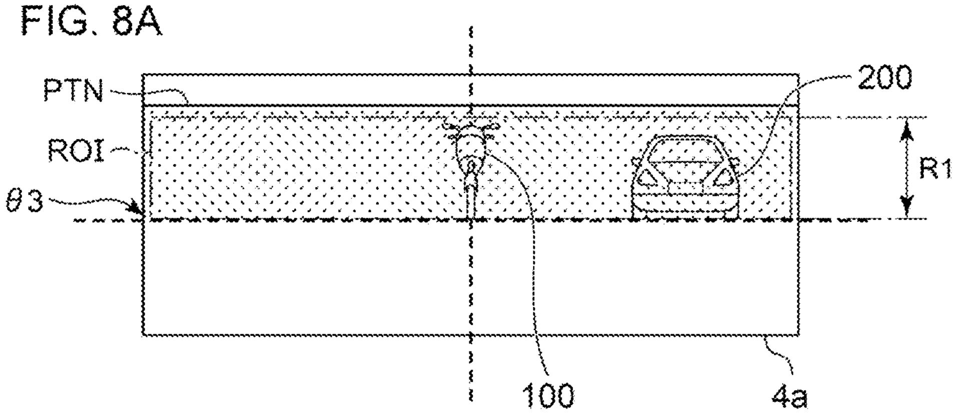
FIGS. 8A, 8B, 8C, and 8D are illustrations for describing a basic operation of vehicle detection and light distribution control.

Next, an operation of the vehicle detecting device 6 and of the light distribution controlling device 8 will be described. FIGS. 8A, 8B, 8C, and 8D are illustrations for describing a basic operation of vehicle detection and light distribution control. FIG. 8A shows a host vehicle 100, an imaging region 4*a* of the imaging device 4, and a light distribution pattern PTN formed in the region ahead of the host vehicle 100. In this example, a high beam light distribution pattern is shown as one example of the light distribution pattern PTN. Furthermore, in order to show the positional relationship of a processing region ROI relative to an image IMG (in other words, the imaging region 4*a*), FIG. 8A shows a processing region ROI, for convenience.

When a front vehicle 200 is present in the region ahead of the host vehicle 100, an image IMG that includes the front vehicle 200 is generated by the imaging device 4 and sent to the vehicle detecting device 6. The image IMG sent to the vehicle detecting device 6 is acquired by the region setting unit 26. The region setting unit 26 sets a processing region ROI in the image IMG. A processing region ROI is a region in which, for example, a front vehicle 200 is predicted to appear, and can be set in advance based on an experiment or simulation conducted by an engineer. In one example, a processing region ROI is a rectangular region that extends in the width direction of the vehicle and lies above a horizontal line. The region setting unit 26 sends the image IMG having the processing region ROI set therein to the image processing unit 12.

Figure 8B:
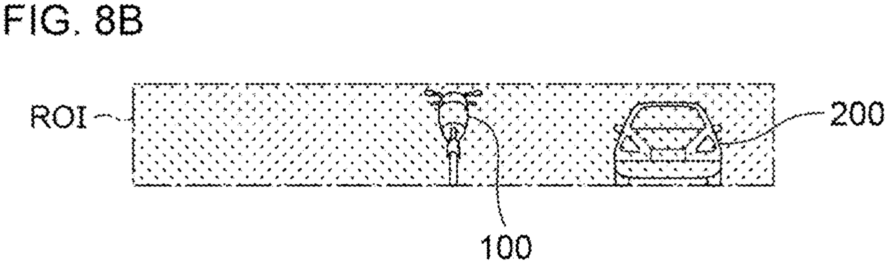
Figure 8C:

The image processing unit 12 extracts the processing region ROI from the image IMG, as shown in FIG. 8B. The image processing unit 12 then performs known image processing, such as binarization, on the processing region ROI. This image processing generates a luminous point image IMGa in which two luminous points 202 corresponding to lamps of the front vehicle 200 are extracted, as shown in FIG. 8C. The lamps of the front vehicle 200 are rear lamps or the like if the front vehicle 200 is a leading vehicle, or they are headlamps or the like if the front vehicle 200 is an oncoming vehicle. A rear lamp includes a stop lamp and a tail lamp. The image processing unit 12 sends the generated luminous point image IMGa to the detection unit 14.

The detection unit 14 determines the presence of the front vehicle 200 using the luminous point image IMGa. Performing a vehicle detecting process on the luminous point image IMGa generated from the processing region ROI corresponds to performing a vehicle detecting process on the processing region ROI. When the luminous point image IMGa includes luminous points 202, the detection unit 14 detects a front vehicle 200 based on these luminous points 202. The detection unit 14 according to the present embodiment determines that luminous points 202 present in a processing region ROI are derived from a front vehicle 200, or in other words, determines that a front vehicle 200 is present at the position where the luminous points 202 are present. The detection unit 14 sends its detection result to the light distribution controlling device 8. Herein, there is no particular limitation on the vehicle detecting method that the detection unit 14 performs. For example, without generating a luminous point image IMGa, the detection unit 14 may detect a front vehicle 200 from a processing region ROI using a known method including, for example, algorithm recognition or deep learning.

Figure 8D:
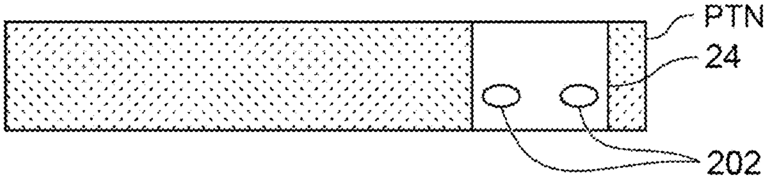

The detection result sent to the light distribution controlling device 8 is acquired by the pattern determining unit 18. When a front vehicle 200 is detected, the pattern determining unit 18 sets a shaded region 24 to overlap the front vehicle 200 in a light distribution pattern that serves as a base, as shown in FIG. 8D. Thus, a light distribution pattern PTN to be formed is determined. A shaded region 24 is a portion of a light distribution pattern PTN where the luminance (illuminance) is zero or a portion of a light distribution pattern PTN where the luminance is reduced to higher than zero but lower than that held prior to shading. When no front vehicle 200 is detected, the pattern determining unit 18 sets a light distribution pattern PTN that does not include a shaded region 24.

A light distribution pattern that serves as a base is selected in accordance with a light distribution mode that is set based, for example, on the driver's instruction input by operating the light switch (not shown), the traveling state of the host vehicle, or the environment surrounding the host vehicle. For example, light distribution modes include, for example, a high beam mode of forming a high beam light distribution pattern, a low beam mode of forming a low beam light distribution pattern, and a town mode of forming a light distribution pattern suitable for traveling in a city area. FIG. 8D shows a high beam light distribution pattern as one example. The pattern determining unit 18 sends information about the determined light distribution pattern PTN to the lamp controlling unit 20.

The lamp controlling unit 20 instructs the light distribution variable lamp 2 to form the light distribution pattern PTN. The lamp controlling unit 20 is constituted, for example, by a known LED driver module (LDM). If the light sources of the light distribution variable lamp 2 are controlled by analog dimming, the lamp controlling unit 20 adjusts the direct current level of the driving current flowing in the light sources. Meanwhile, if the light sources are controlled by pulse width modulation (PWM) dimming, the lamp controlling unit 20 adjusts the mean level of the driving current by switching the current that flows in the light sources to adjust the ratio of the on periods. If the light distribution variable lamp 2 includes a DMD, the lamp controlling unit 20 may control the on/off switching of each mirror element constituting the DMD. If the lamp controlling unit 20 includes a liquid-crystal device, the lamp controlling unit 20 may control the optical transmittance of the liquid-crystal device. Thus, the light distribution pattern PTN is formed ahead of the host vehicle.

Figure 9A:
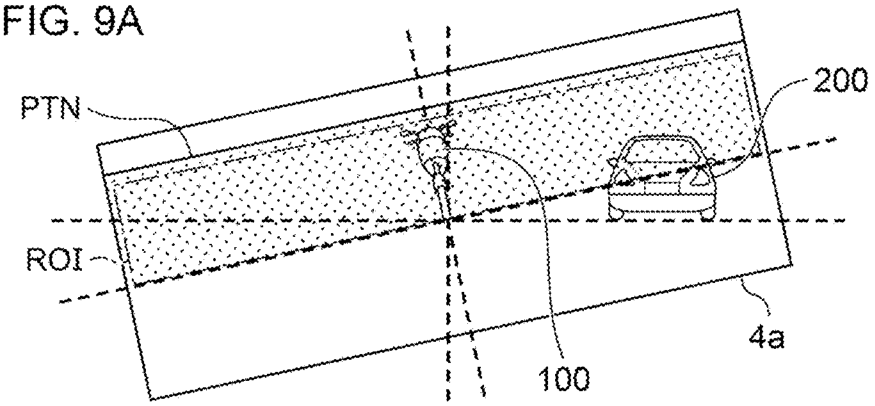
FIGS. 9A, 9B, 9C, and 9D are illustrations for describing a case in which the basic operation is performed while a host vehicle is tilted sideways.

Next, how a processing region ROI is adjusted when a host vehicle 100 becomes tilted sideways will be described. FIGS. 9A, 9B, 9C, and 9D are illustrations for describing a case in which the basic operation is performed while the host vehicle is tilted sideways. As described above, the vehicle detecting device 6 performs the process of detecting a front vehicle 200 from a processing region ROI. In this control, when the attitude of the host vehicle 100 is tilted in the right-left direction, this can create a situation in which a front vehicle 200 cannot be detected. Specifically, when the host vehicle 100 becomes tilted sideways as shown in FIG. 9A, the imaging region 4*a* of the imaging device 4 provided in the host vehicle 100 also becomes tilted sideways. In particular, if the host vehicle 100 is a straddle-type vehicle, the host vehicle 100 banks greatly to the right and left when traveling on a curved road. Therefore, the imaging region 4*a* tends to tilt greatly as well.

Figure 9B:
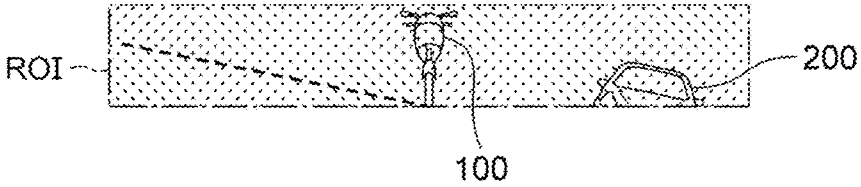
Figure 9C:
Figure 9D:
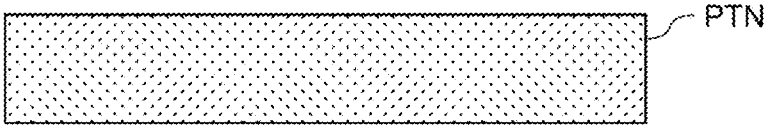

An image IMG obtained when the imaging region 4*a* is tilted sideways is an image that is tilted with respect to the ground surface. Therefore, a processing region ROI extracted from this image IMG is also tilted with respect to the ground surface, as shown in FIG. 9B. When the processing region ROI is tilted, lamps of a front vehicle 200 may lie outside the processing region ROI. Therefore, a luminous point image IMGa that does not include a luminous point 202 can be generated, as shown in FIG. 9C. Vehicle detection performed with the use of such a luminous point image IMGa cannot detect a front vehicle 200 even when the front vehicle 200 is actually present. As a result, a light distribution pattern PTN that includes no shaded region 24 is set, as shown in FIG. 9D. Herein, even in a case in which a front vehicle 200 is to be detected without the use of luminous points 202, a front vehicle 200 may lie outside a processing region ROI as the processing region ROI becomes tilted, and the front vehicle 200 may fail to be detected.

Accordingly, the vehicle detecting device 6 according to the present embodiment, in accordance with a change in the angle of tilt (bank angle) of the vehicle's right-left axis relative to a horizontal line, modifies a processing region ROI so as to mitigate a shift in the processing region ROI caused by the change. In other words, the vehicle detecting device 6 sets, in an image IMG, a processing region ROI modified so as to mitigate the shift.

Specifically, the measurement result sent from the attitude sensor 10 to the vehicle detecting device 6 is acquired by the region adjusting unit 28. Based on the acquired measurement result, the region adjusting unit 28 can detect a change in the angle of tilt of the host vehicle 100. In response to detecting a change in the angle of tilt of the host vehicle 100, the region adjusting unit 28 modifies the processing region ROI so as to mitigate a shift in the processing region ROI with respect to the region ahead. In other words, with the portion of the region ahead that overlaps the processing region ROI when the host vehicle 100 is not tilted set as a reference portion, the region adjusting unit 28 modifies the processing region ROI so that the overlap (the area) between the reference portion and the processing region ROI held when the host vehicle 100 is tilted becomes larger than when such an adjustment is not made to the processing region ROI. This adjustment makes a front vehicle 200 more likely to be included in the processing region ROI even when the host vehicle 100 becomes tilted.

The region adjusting unit 28 modifies at least one of a region range of the processing region ROI in the up-down direction of the vehicle or a region angle of the processing region ROI. First, a case in which the region adjusting unit 28 modifies the region range of the processing region ROI will be described. FIGS. 10A, 10B, 10C and 10D are illustrations for describing how the region range of the processing region ROI is adjusted. When the angle of tilt of the right-left axis of the host vehicle 100 is a first angle with respect to a horizontal line, the region range of the processing region ROI in the up-down direction of the vehicle, that is, the region range in the up-down direction of the image is a first range R1. For example, the processing region ROI of the first range R1 is held by default in the vehicle detecting device 6. When the host vehicle 100 is substantially not tilted, that is, when the angle of tilt of the vehicle's right-left axis is about 0 degrees (first angle≈0 degrees), the vehicle detecting device 6 detects a front vehicle 200 using the processing region ROI of the first range R1, as shown in FIGS. 8A to 8D.

Figure 10A:
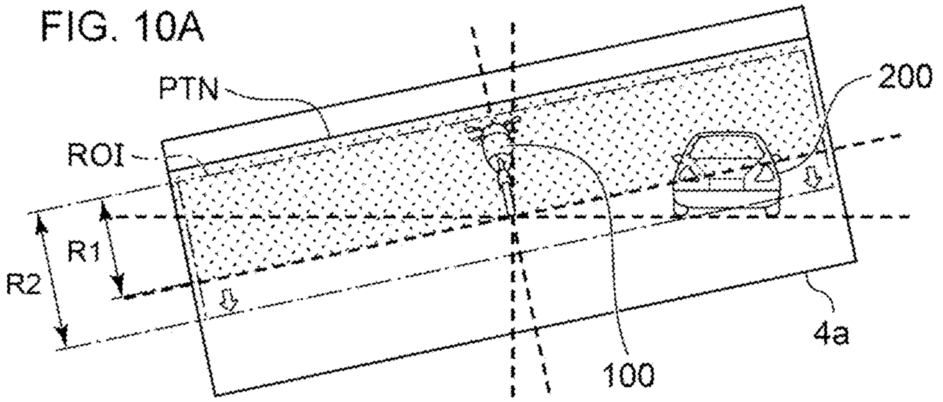
FIGS. 10A, 10B, 10C, and 10D are illustrations for describing how a region range of a processing region is adjusted.

When the host vehicle 100 becomes tilted sideways and the angle of tilt of its right-left axis becomes a second angle greater than the first angle with respect to a horizontal line, the region adjusting unit 28 sets the region range in the up-down direction of the vehicle to a second range R2 greater than the first range R1, as shown in FIG. 10A. The processing region ROI according to the present embodiment is rectangular with the upper and lower sides extending in the right-left direction of the vehicle or of the image and the left and right sides extending in the up-down direction. The region adjusting unit 28 displaces the upper side of the processing region ROI upward or displaces the lower side downward, or performs both of these displacing operations. Preferably, the adjustment of the region range includes displacing the lower side of the processing region ROI.

For example, the region adjusting unit 28 holds, in advance, a threshold of the angle of tilt of the vehicle's right-left axis, and when the angle of tilt of the host vehicle 100 has exceeded the threshold, the region adjusting unit 28 expands the region range of the processing region ROI from the first range R1 to the second range R2. This threshold can be set as appropriate based on an experiment or simulation conducted by an engineer. Expanding the range of the processing region ROI in the up-down direction from the first range R1 to the second range R2 corresponds to the mitigating of a shift in the processing region ROI. Herein, as long as either at least a portion of the upper side of the processing region ROI is expanded upward or at least a portion of the lower side of the processing region ROI is expanded downward, such expanding corresponds to the shift mitigation.

Figure 10B:
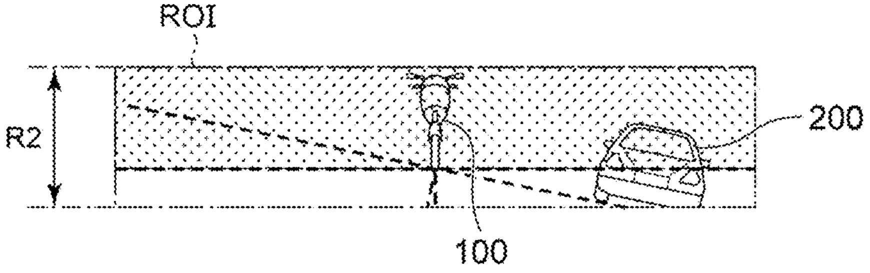
Figure 10C:
Figure 10D:
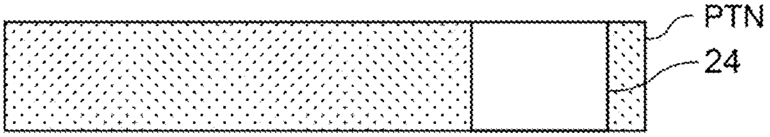

The image processing unit 12 extracts the processing region ROI of the second range R2 from the image IMG, as shown in FIG. 10B. As the processing region ROI is expanded from the first range R1 to the second range R2, even when the host vehicle 100 becomes tilted sideways, a front vehicle 200 lying outside the processing region ROI can be suppressed. Accordingly, it becomes more likely that a luminous point image IMGa generated from this processing region ROI includes two luminous points 202 corresponding to lamps of a front vehicle 200, as shown in FIG. 10C. Hence, even when the host vehicle 100 becomes tilted sideways, a front vehicle 200 can be detected with high accuracy. As a result, a light distribution pattern PTN that includes a shaded region 24 to overlap a front vehicle 200 can be formed ahead of the host vehicle, as shown in FIG. 10D.

Herein, when the host vehicle 100 is tilted at a first angle greater than 0 degrees, vehicle detection may be performed with the use of the processing region ROI of the first range R1, and when the host vehicle 100 becomes further tilted at a second angle greater than the first angle, vehicle detection may be performed with the use of the processing region ROI of the second range R2. Furthermore, the region adjusting unit 28 may modify the region range in the up-down direction continuously or stepwise including three or more steps, in accordance with a change in the angle of tilt of the vehicle's right-left axis. In other words, the region range may be increased as the angle of tilt of the host vehicle 100 increases.

Next, a case in which the region adjusting unit 28 modifies the region angle of the processing region ROI will be described. FIGS. 11A, 11B, 11C, and 11D are illustrations for describing how the region angle of the processing region ROI is adjusted. The region angle of the processing region ROI is the angle about the vehicle's front-rear axis or the angle about the imaging axis of the imaging device 4. Furthermore, the region angle is the angle relative to the vehicle's right-left axis, that is, for example, the angle formed by the upper side or lower side of the processing region ROI and the vehicle's right-left axis.

When the angle of tilt of the right-left axis of the host vehicle 100 is a first angle with respect to a horizontal line, the region angle of the processing region ROI is a third angle θ3. For example, the processing region ROI of the third angle θ3 is held by default in the vehicle detecting device 6. When the host vehicle 100 is substantially not tilted, that is, when the angle of tilt of the vehicle's right-left axis is about 0 degrees (first angle≈0 degrees), the vehicle detecting device 6 detects a front vehicle 200 using the processing region ROI of the third angle θ3 (θ3≈0 degrees), as shown in FIGS. 8A to 8D.

Figure 11A:
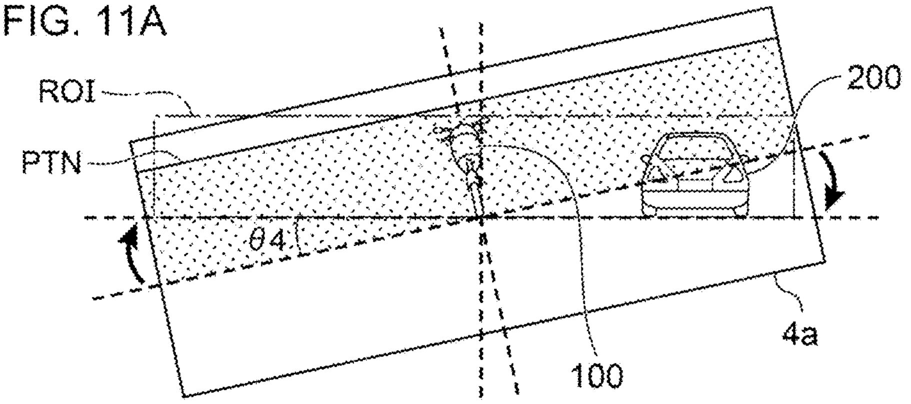
FIGS. 11A, 11B, 11C, and 11D are illustrations for describing how a region angle of a processing region is adjusted.

When the host vehicle 100 becomes tilted sideways and the angle of tilt of its right-left axis becomes a second angle greater than the first angle with respect to a horizontal line, the region adjusting unit 28 sets the region angle of the processing region ROI to a fourth angle θ4 greater than the third angle θ3, as shown in FIG. 11A. The pivoting direction of the processing region ROI is opposite the direction in which the host vehicle 100 tilts. In other words, when the host vehicle 100 is tilted to the left as shown in FIG. 11A, the processing region ROI is tilted to the right (i.e., pivoted clockwise). Meanwhile, when the host vehicle 100 is tilted to the right, the processing region ROI is tilted to the left (i.e., pivoted counterclockwise).

For example, the region adjusting unit 28 holds, in advance, a threshold of the angle of tilt of the vehicle's right-left axis, and when the angle of tilt of the host vehicle 100 has exceeded the threshold, the region adjusting unit 28 modifies the region angle of the processing region ROI from the third angle θ3 to the fourth angle θ4. This threshold can be set as appropriate based on an experiment or simulation conducted by an engineer. Increasing the angle of the processing region ROI with respect to the vehicle's right-left axis from the third angle θ3 to the fourth angle θ4 corresponds to the mitigating of a shift in the processing region ROI. Herein, as long as the angle of at least a portion of the processing region ROI is modified, such modifying corresponds to the shift mitigation.

Figure 11B:
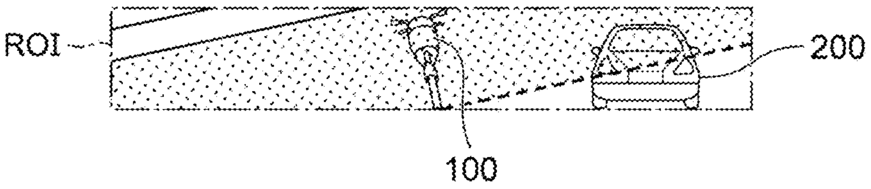
Figure 11C:
Figure 11D:
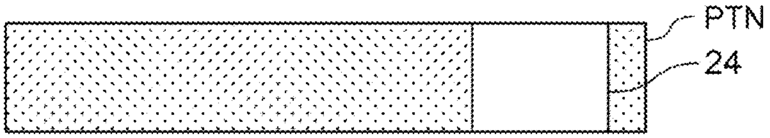

The image processing unit 12 extracts the processing region ROI of the fourth angle θ4 from the image IMG, as shown in FIG. 11B. As the processing region ROI is tilted from the third angle θ3 to the fourth angle θ4 with respect to the vehicle's right-left axis, even when the host vehicle 100 becomes tilted sideways, a front vehicle 200 lying outside the processing region ROI can be suppressed. Accordingly, it becomes more likely that a luminous point image IMGa generated from this processing region ROI includes two luminous points 202 corresponding to lamps of a front vehicle 200, as shown in FIG. 11C. Hence, even when the host vehicle 100 becomes tilted sideways, a front vehicle 200 can be detected with high accuracy. As a result, a light distribution pattern PTN that includes a shaded region 24 to overlap a front vehicle 200 can be formed ahead of the host vehicle, as shown in FIG. 11D.

Herein, when the host vehicle 100 is tilted at a first angle greater than 0 degrees, vehicle detection may be performed with the use of the processing region ROI of the third angle θ3, and when the host vehicle 100 becomes further tilted at a second angle greater than the first angle, vehicle detection may be performed with the use of the processing region ROI of the fourth angle θ4. Furthermore, the region adjusting unit 28 may modify the region angle continuously or stepwise including three or more steps, in accordance with a change in the angle of tilt of the vehicle's right-left axis. In other words, the region angle may be increased as the angle of tilt of the host vehicle 100 increases.

The region adjusting unit 28 may modify both the region range and the region angle of the processing region ROI. This can further reduce the likelihood that a front vehicle 200 lies outside the processing region ROI due to the tilting of the host vehicle 100. Accordingly, a front vehicle 200 can be detected with higher accuracy.

Figure 12:
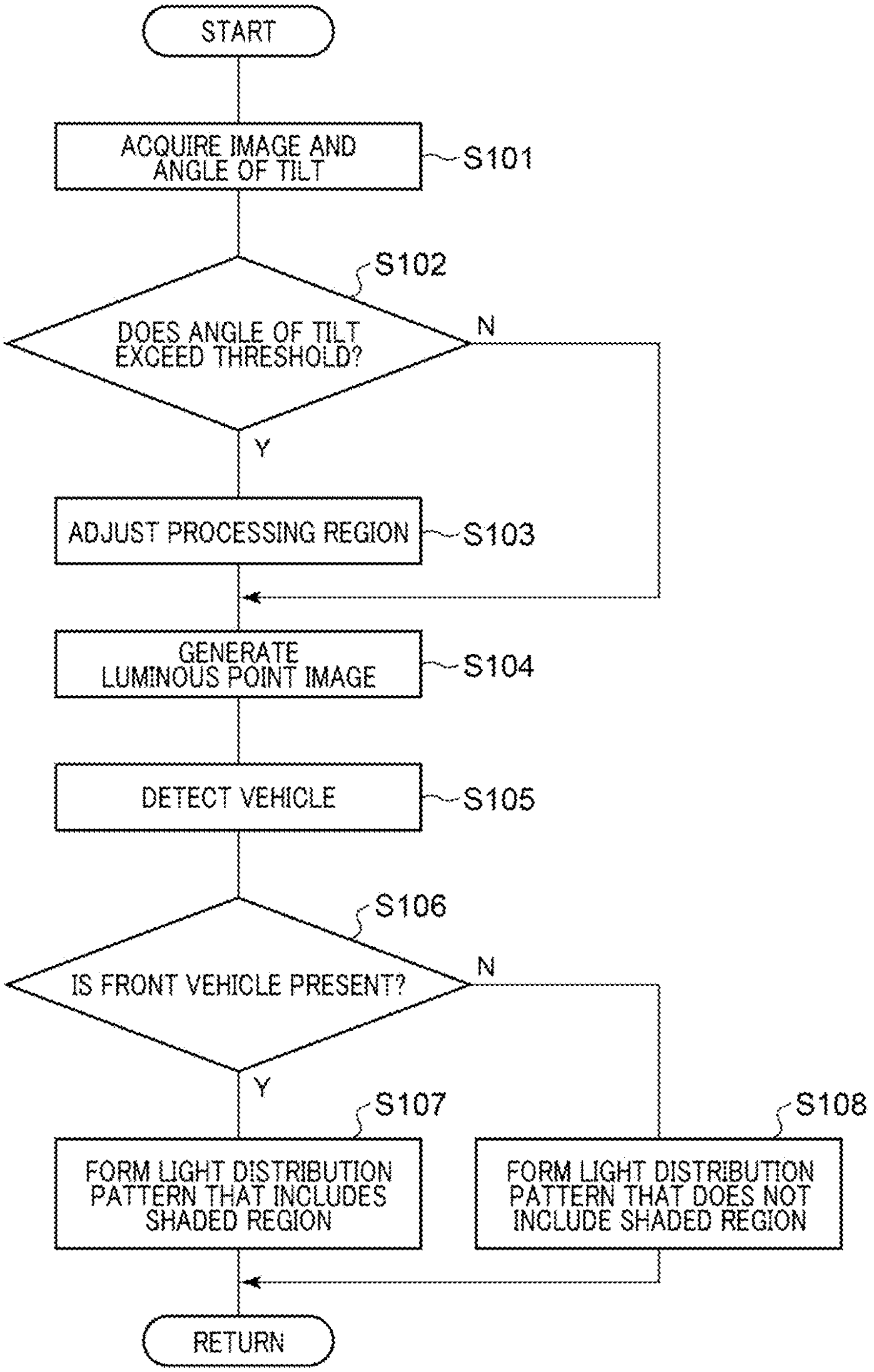
FIG. 12 is a flowchart for describing one example of control executed by a vehicle detecting device and a light distribution controlling device.

FIG. 12 is a flowchart for describing one example of control executed by the vehicle detecting device 6 and the light distribution controlling device 8. This flow is executed repeatedly at predetermined timings, for example, when the execution of ADB control is instructed via a light switch (not shown) and when the ignition is on.

First, the vehicle detecting device 6 acquires an image IMG from the imaging device 4. The vehicle detecting device 6 also acquires the angle of tilt of the host vehicle 100 from the attitude sensor 10 (S101). Then, the vehicle detecting device 6 determines whether the angle of tilt of the right-left axis of the host vehicle 100 is greater than a threshold (S102). If the angle of tilt is greater than the threshold (Y at S102), the vehicle detecting device 6 adjusts at least one of the region range or the region angle of the processing region ROI (S103), and proceeds to step S104. If the angle of tilt is not greater than the threshold (N at S102), the vehicle detecting device 6 proceeds to step S104 without adjusting the processing region ROI.

Next, the vehicle detecting device 6 extracts the processing region ROI from the image IMG and generates a luminous point image IMGa from the processing region ROI (S104). The vehicle detecting device 6 performs a vehicle detecting process using the generated luminous point image IMGa (S105). Then, the vehicle detecting device 6 determines whether a front vehicle 200 is present based on the result of the vehicle detecting process (S106). If a front vehicle 200 is present (Y at S106), the light distribution controlling device 8 controls the light distribution variable lamp 2 so as to form a light distribution pattern PTN that includes a shaded region 24 (S107), and terminates the present routine. If no front vehicle 200 is present (N at S106), the light distribution controlling device 8 controls the light distribution variable lamp 2 so as to form a light distribution pattern PTN that does not include a shaded region 24 (S108), and terminates the present routine.

As described above, the vehicle detecting device 6 according to the present embodiment sets a processing region ROI in an image IMG that is based on the imaging device 4 provided in the host vehicle 100 and performs a process of detecting a front vehicle 200 from the processing region ROI. According to the present embodiment, the vehicle detecting process is performed after a processing region ROI has been converted to a luminous point image IMGa. As the target of vehicle detection is narrowed to a processing region ROI, the load on the vehicle detecting device 6 can be reduced, as compared to the case of detecting a vehicle from an entire image IMG.

Furthermore, the vehicle detecting device 6, in accordance with a change in the angle of tilt of the vehicle's right-left axis relative to a horizontal line, modifies the processing region ROI so as to mitigate a shift in the processing region ROI caused by the change. Adjusting the processing region ROI dynamically in accordance with the tilt of the host vehicle 100 in this manner makes it possible to avoid missing a front vehicle 200. Accordingly, the accuracy of detecting a front vehicle 200 can be increased. The vehicle detecting device 6 according to the present embodiment modifies at least one of the region range of the processing region ROI in the up-down direction of the vehicle or the region angle of the processing region ROI. In other words, the vehicle detecting device 6 adjusts at least one of the shape or the orientation of the processing region ROI.

When modifying the region range, the vehicle detecting device 6 sets the region range to the first range R1 when the angle of tilt is the first angle and sets the region range to the second range R2 greater than the first range R1 when the angle of tilt is the second angle greater than the first angle. As the processing region ROI is made relatively small when the angle of tilt of the host vehicle 100 is relatively small and the processing region ROI is made relatively large when the angle of tilt is relatively large as described above, the processing load on the vehicle detecting device 6 can be reduced, as compared to the case of performing vehicle detection using a processing region ROI that is large by default regardless of the angle of tilt of the host vehicle 100. Furthermore, the above can suppress erroneous determination that a luminous point 202 that is not of a front vehicle 200 is determined to have come from a front vehicle 200.

Meanwhile, when modifying the region angle, the vehicle detecting device 6 sets the region angle with respect to the vehicle's right-left axis to the third angle θ3 when the angle of tilt of the first angle and sets the region angle with respect to the vehicle's right-left axis to the fourth angle θ4 greater than the third angle θ3 when the angle of tilt is the second angle greater than the first angle. Modifying the region angle in accordance with the tilt of the host vehicle 100 while retaining the shape of the processing region ROI in this manner can suppress erroneous determination.

The host vehicle 100 provided with the vehicle detecting device 6 according to the present embodiment is a straddle-type vehicle. The vehicle's right-left axis of a straddle-type vehicle tends to become tilted to a greater extent than that of a typical four-wheeled automobile. Therefore, the vehicle detecting device 6 can exhibit its functionality effectively especially in straddle-type vehicles. Herein, the host vehicle 100 may be a vehicle other than a straddle-type vehicle, such as a four-wheeled automobile.

The light distribution controlling device 8 according to the present embodiment sets a light distribution pattern PTN that includes a shaded region 24 to overlap a front vehicle 200, based on a detection result of the vehicle detecting device 6. This configuration makes it possible to achieve, with higher accuracy, both the reduction of glare caused on the driver of a front vehicle 200 and the improvement in the visibility of the driver of the host vehicle 100. Accordingly, safety in vehicle driving can be improved.

Thus far, Embodiment 2 according to the present invention has been described in detail. The embodiment described above merely illustrates a specific example for implementing the present invention. The contents of the embodiment do not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiment described above, the expressions "according to the present embodiment," "in the present embodiment," and so on are added for emphasis to the content that can be subjected to such a design change as described above, but such a design change is also permitted on the content without these expressions. Any desired combination of the constituent elements described above is also valid as an aspect of the present invention. Hatching added along a section in the drawings does not limit the material of such with hatching.

The invention according to Embodiment 2 described above may be identified through the items indicated below.

[First Item]

A vehicle detecting device (6) that:

sets a processing region (ROI) in an image (IMG) that is based on an imaging device (4) provided in a vehicle (100) and performs a process of detecting a front vehicle (200) from the processing region (ROI); and in accordance with a change in an angle of tilt of the vehicle's right-left axis, modifies the processing region (ROI) so as to mitigate a shift in the processing region (ROI) caused by the change.

[Second Item]

The vehicle detecting device (6) according to First Item, wherein the vehicle detecting device (6) modifies at least one of a region range of the processing region (ROI) in the up-down direction of the vehicle or a region angle of the processing region (ROI), when modifying the region range, the vehicle detecting device (6) sets the region range to a first range (R1) when the angle of tilt is a first angle, and sets the region range to a second range (R2) greater than the first angle when the angle of tilt is a second angle greater than the first angle, and when modifying the region angle, the vehicle detecting device (6) sets the region angle to a third angle (03) when the angle of tilt is a first range, and sets the region angle to a fourth angle (04) greater than the third angle (03) when the angle of tilt is a second angle greater than the first angle.

[Third Item]

The vehicle detecting device (6) according to First Item or Second Item, wherein the vehicle (100) is a straddle-type vehicle.

[Fourth Item]

A light distribution controlling device (8) that:

based on a detection result of the vehicle detecting device (6) according to any one of First Item to Third Item, sets a light distribution pattern (PTN) that includes a shaded region (24) to overlap the front vehicle (200).

[Fifth Item]

A vehicle detecting method including:

setting a processing region (ROI) in an image (IMG) that is based on an imaging device (4) provided in a vehicle (100), and performing a process of detecting a front vehicle (200) from the processing region (ROI); and in accordance with a change in an angle of tilt of the vehicle's right-left axis, modifying the processing region (ROI) so as to mitigate a shift in the processing region (ROI) caused by the change.

Embodiment 3

Figure 13:
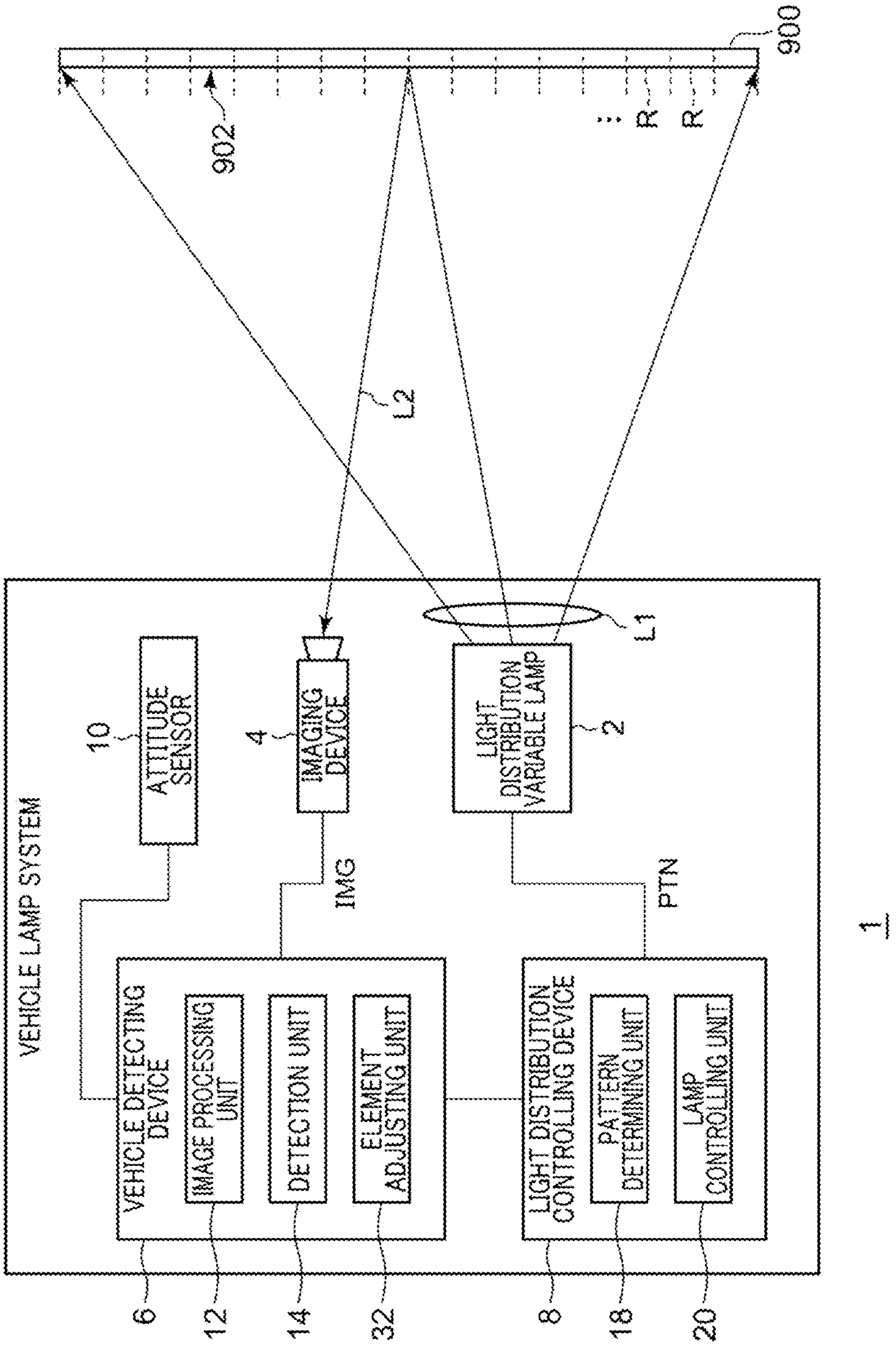
FIG. 13 is a block diagram of a vehicle lamp system according to Embodiment 3.

FIG. 13 is a block diagram of a vehicle lamp system 1. FIG. 13 depicts constituent elements of the vehicle lamp system 1 in the form of functional blocks. These functional blocks are implemented, as to their hardware configuration, by elements or circuits, such as a CPU or memory of a computer, or implemented, as to their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, a vehicle detecting device 6, a light distribution controlling device 8, and an attitude sensor 10. These components are provided in a vehicle. A vehicle in which the vehicle lamp system 1 is provided according to the present embodiment is a straddle-type vehicle, such as a motorcycle. The light distribution variable lamp 2, the imaging device 4, the vehicle detecting device 6, the light distribution controlling device 8, and the attitude sensor 10 may all be contained within a single housing, or some of these members may be provided outside such a housing.

For example, the light distribution variable lamp 2, the imaging device 4, the vehicle detecting device 6, the light distribution controlling device 8, and the attitude sensor 10 are housed in a lamp room. The lamp room is defined by a lamp body having an opening that opens to the front side of the vehicle and a light-transmissive cover attached so as to cover the opening of the lamp body. The imaging device 4, the vehicle detecting device 6, the light distribution controlling device 8, and the attitude sensor 10 may be provided outside the lamp room, such as in the vehicle. In this case, the imaging device 4 may be an onboard camera. The vehicle detecting device 6 and the light distribution controlling device 8 may be, for example, entirely or partly constituted by a vehicle ECU.

The light distribution variable lamp 2 is capable of illuminating a region ahead of the host vehicle with a visible light beam L1 of a variable intensity distribution. The light distribution variable lamp 2 is enabled to vary the illuminance of light in a plurality of illuminated individual regions R arrayed ahead of the vehicle independently of each other. The plurality of individual regions R are arrayed, for example, in a matrix. The light distribution variable lamp 2 receives information instructing on a light distribution pattern PTN from the light distribution controlling device 8 and emits a visible light beam L1 having an intensity distribution corresponding to the light distribution pattern PTN. Thus, the light distribution pattern PTN is formed ahead of the host vehicle. A light distribution pattern PTN can be understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the space ahead of the host vehicle with light from a light source. In an alternative configuration, illumination of light directed to the region ahead of the host vehicle may be blocked partly by a shading plate.

The imaging device 4 has a sensitivity to a visible light range and repeatedly captures an image of the region ahead of the host vehicle. The imaging device 4 captures an image of reflected light L2 of a visible light beam L1 reflected from an object located ahead of the vehicle. The imaging device 4 also captures an image of light from a front vehicle, including a leading vehicle and an oncoming vehicle. An image IMG that the imaging device 4 generates is sent to the vehicle detecting device 6.

An image IMG that the vehicle detecting device 6 acquires from the imaging device 4 may be RAW image data or image data subjected to predetermined image processing by the imaging device 4. When the vehicle detecting device 6 receives image data resulting from subjecting RAW image data generated by the imaging device 4 to image processing performed by a processing device other than the imaging device 4, this receiving also corresponds to the acquiring of an image IMG from the imaging device 4. In the following description, "an image IMG that is based on the imaging device 4" may mean either of RAW image data and data subjected to image processing. Furthermore, the expression "image IMG" may be used without any distinction between the two types of image data.

The vehicle detecting device 6 detects a front vehicle using an image IMG that is based on the imaging device 4. The vehicle detecting device 6 sends its detection result to the light distribution controlling device 8. Herein, the vehicle detecting device 6 may detect a target aside from a front vehicle. The vehicle detecting device 6 can be constituted by a digital processor, and for example, the vehicle detecting device 6 may be constituted by a combination of a microcomputer including a CPU and a software program or by a field programmable gate array (FPGA), an application specific IC (ASIC), or the like. The vehicle detecting device 6 includes, in one example, an image processing unit 12, a detection unit 14, and an element adjusting unit 32. Each of these units operates as an integrated circuit constituting itself executes a program stored in a memory. An operation of each of these units will be described later.

The light distribution controlling device 8 executes ADB control of dynamically and adaptively controlling the light distribution of the light distribution variable lamp 2 in accordance with a target present in the region ahead. The light distribution controlling device 8 according to the present embodiment sets a light distribution pattern PTN that includes a shaded region to overlap a front vehicle, based on a detection result of the vehicle detecting device 6. The light distribution controlling device 8 sends information instructing on a light distribution pattern PTN to the light distribution variable lamp 2. The light distribution controlling device 8 can be constituted by a digital processor, and for example, the light distribution controlling device 8 may be constituted by a combination of a microcomputer including a CPU and a software program or by a field programmable gate array (FPGA), an application specific IC (ASIC), or the like. The light distribution controlling device 8 includes, in one example, a pattern determining unit 18 and a lamp controlling unit 20. Each of these units operates as an integrated circuit constituting itself executes a program stored in a memory. An operation of each of these units will be described later.

The attitude sensor 10 measures the tilt of the host vehicle in the right-left direction. That is, the attitude sensor 10 measures the angle of tilt of the vehicle's right-left axis with respect to a horizontal line or a vertical line (in other words, the angle of tilt of the vehicle's up-down axis with respect to a horizontal line or a vertical line). The attitude sensor 10 is constituted, for example but not limited to, by a known inertial measurement unit (IMU). The attitude sensor 10 sends its measurement result to the vehicle detecting device 6.

Figure 14A:
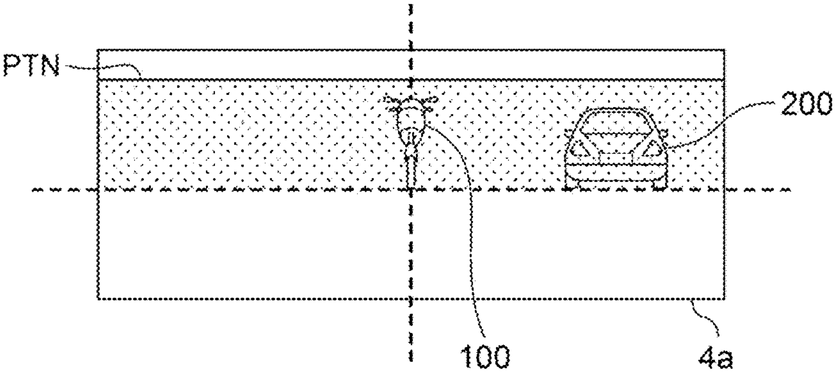
FIGS. 14A, 14B, 14C, and 14D are illustrations for describing a basic operation of vehicle detection and light distribution control.

Next, an operation of the vehicle detecting device 6 and of the light distribution controlling device 8 will be described. FIGS. 14A to 14D and FIGS. 15A to 15D are illustrations for describing a basic operation of vehicle detection and light distribution control. FIG. 14A shows a host vehicle 100, an imaging region 4*a* of the imaging device 4, and a light distribution pattern PTN formed in the region ahead of the host vehicle 100. In this example, a high beam light distribution pattern is shown as one example of the light distribution pattern PTN.

Figure 14B:
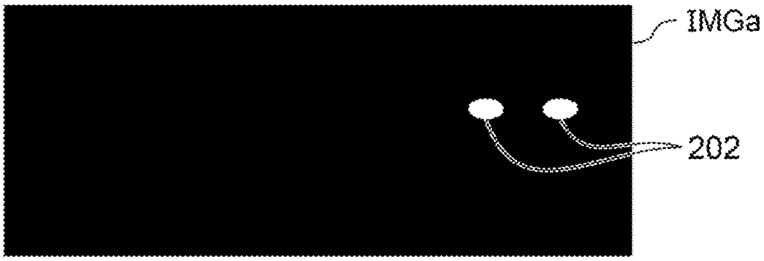

When a front vehicle 200 is present in the region ahead of the host vehicle 100, an image IMG that includes the front vehicle 200 is generated by the imaging device 4 and sent to the vehicle detecting device 6. The image IMG sent to the vehicle detecting device 6 is acquired by the image processing unit 12. The image processing unit 12 performs known image processing, such as binarization, on the image IMG. This image processing generates a luminous point image IMGa in which two luminous points 202 corresponding to lamps of the front vehicle 200 are extracted, as shown in FIG. 14B. The lamps of the front vehicle 200 are rear lamps or the like if the front vehicle 200 is a leading vehicle, or they are headlamps or the like if the front vehicle 200 is an oncoming vehicle. A rear lamp includes a stop lamp and a tail lamp. The image processing unit 12 sends the generated luminous point image IMGa to the detection unit 14.

Figure 14C:
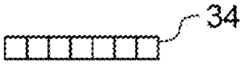

The detection unit 14 determines the presence of the front vehicle 200 using the luminous point image IMGa. The detection unit 14 stores therein a first structuring element 34 (kernel) of a predetermined shape set in advance, as shown in FIG. 14C. The first structuring element 34 has a shape elongated in the right-left direction of the luminous point image IMGa. The detection unit 14 maps the center pixel of the first structuring element 34 to each pixel (pixel of interest) of the luminous point image IMGa to thus perform a horizontal dilation process on the luminous point image IMGa. FIG. 14C schematically shows the first structuring element 34, but the number of pixels forming the portions that extend to the right and left from the center pixel of the first structuring element 34 is not limited to what is depicted in the drawing.

Figure 14D:

In the horizontal dilation process, when any one of the pixels that the first structuring element 34 overlaps is a pixel of high pixel value, the pixel value of the pixel of interest is converted to this high pixel value. Thus, each luminous point 202 in a luminous point image IMGa is dilated horizontally, as shown in FIG. 14D. Through this dilation, two luminous points 202 appearing side by side with a predetermined gap therebetween become coupled to each other. As a result, a single horizontally dilated region 36 is generated.

When there are two dilated luminous points 202 to be coupled to each other through the horizontal dilation process performed with the use of the first structuring element 34, the detection unit 14 detects a front vehicle 200 based on these two luminous points 202. When two dilated luminous points 202 to be coupled to each other are present in a luminous point image IMGa, the detection unit 14 according to the present embodiment determines that these two luminous points 202 are derived from a front vehicle 200, or in other words, determines that a front vehicle 200 is present at the position where these two luminous points 202 are present. Normally, when an image of a leading vehicle's rear lamps or an oncoming vehicle's headlamps is captured, these lamps appear, in an image IMG, as two luminous points 202 that are aligned at the same height while horizontally spaced apart by a predetermined gap therebetween. Therefore, a front vehicle 200 can be detected based on the positional relationship of these two luminous points 202 within the image IMG.

Figure 15A:
FIGS. 15A, 15B, 15C, and 15D are illustrations for describing a basic operation of vehicle detection and light distribution control.

The detection unit 14 also performs a horizontal erosion process on a luminous point image IMGa with the use of the first structuring element 34. In the horizontal erosion process, when any one of the pixels that the first structuring element 34 overlaps is a pixel of low pixel value, the pixel value of the pixel of interest is converted to this low pixel value. Thus, the horizontally dilated region 36 is eroded in the horizontal direction, and a horizontally eroded region 38 is generated, as shown in FIG. 15A. As the horizontal erosion process is performed on the horizontally dilated region 36, the pixels of high pixel value located outward, in the right-left direction, of the two nondilated luminous points 202 can be converted to pixels of low pixel value. Thus, the position of the front vehicle 200 can be detected with higher accuracy. For example, the detection unit 14 detects the position itself of the horizontally eroded region 38 in the luminous point image IMGa as the position of the front vehicle 200. The detection unit 14 sends its detection result to the light distribution controlling device 8.

The detection result sent to the light distribution controlling device 8 is acquired by the pattern determining unit 18. When the front vehicle 200 is detected, the pattern determining unit 18 sets a light distribution pattern PTN that includes a shaded region to overlap the front vehicle 200. The shaded region is a portion of the light distribution pattern PTN where the luminance (illuminance) is zero or a portion of the light distribution pattern PTN where the luminance is reduced to higher than zero but lower than that held prior to shading. When no front vehicle 200 is detected, the pattern determining unit 18 sets a light distribution pattern PTN that does not include a shaded region.

Figure 15B:
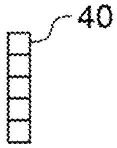
Figure 15C:

The pattern determining unit 18 of one example acquires a luminous point image IMGa subjected to a horizontal erosion process as the detection result of the vehicle detecting device 6. Furthermore, the pattern determining unit 18 stores therein a second structuring element 40 of a predetermined shape set in advance, as shown in FIG. 15B. The second structuring element 40 has a shape elongated in the up-down direction of the luminous point image IMGa. The pattern determining unit 18 maps the upper end pixel of the second structuring element 40 to each pixel (pixel of interest) of the acquired luminous point image IMGa to thus perform a vertical dilation process on the luminous point image IMGa. FIG. 15B schematically shows the second structuring element 40, but the number of pixels forming the portion that extends downward from the upper end pixel of the second structuring element 40 is not limited to what is depicted in the drawing. In the vertical dilation process, when any one of the pixels that the second structuring element 40 overlaps is a pixel of high pixel value, the pixel value of the pixel of interest is converted to this high pixel value. Thus, the horizontally eroded region 38 is dilated upward, and a vertically dilated region 42 is generated, as shown in FIG. 15C.

Figure 15D:
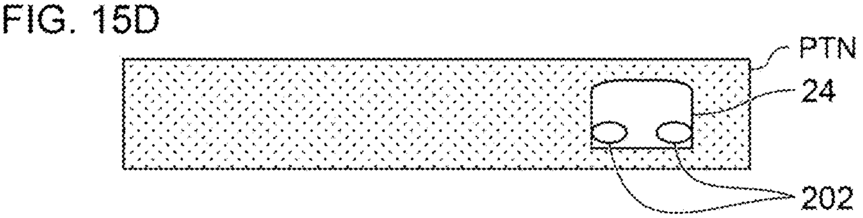

The pattern determining unit 18 sets a shaded region 24 in the light distribution pattern that serves as a base, based on the position of the vertically dilated region 42 in the luminous point image IMGa, as shown in FIG. 15D. Thus, a light distribution pattern PTN that includes the shaded region 24 is determined. For example, the pattern determining unit 18 generates an inverted image by inverting the pixel value of each pixel of the luminous point image IMGa that includes the vertically dilated region 42. Then, the pattern determining unit 18 sets, as the shaded region 24, the set of pixels of low pixel value corresponding to the vertically dilated region 42 in the inverted image.

Herein, the pattern determining unit 18 may reverse the order of the generating the inverted image and the image processing involving the use of the second structuring element 40. In other words, the pattern determining unit 18 generates an inverted image from a luminous point image IMGa. Then, the pattern determining unit 18 performs a vertical erosion process on the inverted image using the second structuring element 40. Thus, the region of high pixel value located over the horizontally eroded region 38 erodes in the vertical direction, and a vertically eroded region is generated. As the pattern determining unit 18 sets this vertical erosion region as a shaded region 24, the pattern determining unit 18 can determine a light distribution pattern PTN that includes the shaded region 24. Meanwhile, the pattern determining unit 18 may acquire only the position information (e.g., the angle relative to the host vehicle 100) of the front vehicle 200 as the detection result of the vehicle detecting device 6 and set a shaded region 24 based on this position information.

A light distribution pattern that serves as a base is selected in accordance with a light distribution mode that is set based, for example, on the driver's instruction input by operating the light switch (not shown), the traveling state of the host vehicle, or the environment surrounding the host vehicle. For example, light distribution modes include, for example, a high beam mode of forming a high beam light distribution pattern, a low beam mode of forming a low beam light distribution pattern, and a town mode of forming a light distribution pattern suitable for traveling in a city area. FIG. 15D shows a high beam light distribution pattern as one example. The pattern determining unit 18 sends information about the determined light distribution pattern PTN to the lamp controlling unit 20.

The lamp controlling unit 20 instructs the light distribution variable lamp 2 to form the light distribution pattern PTN. The lamp controlling unit 20 is constituted, for example, by a known LED driver module (LDM). If the light sources of the light distribution variable lamp 2 are controlled by analog dimming, the lamp controlling unit 20 adjusts the direct current level of the driving current flowing in the light sources. Meanwhile, if the light sources are controlled by pulse width modulation (PWM) dimming, the lamp controlling unit 20 adjusts the mean level of the driving current by switching the current that flows in the light sources to adjust the ratio of the on periods. If the light distribution variable lamp 2 includes a DMD, the lamp controlling unit 20 may control the on/off switching of each mirror element constituting the DMD. If the lamp controlling unit 20 includes a liquid-crystal device, the lamp controlling unit 20 may control the optical transmittance of the liquid-crystal device. Thus, the light distribution pattern PTN is formed ahead of the host vehicle.

Figure 16A:
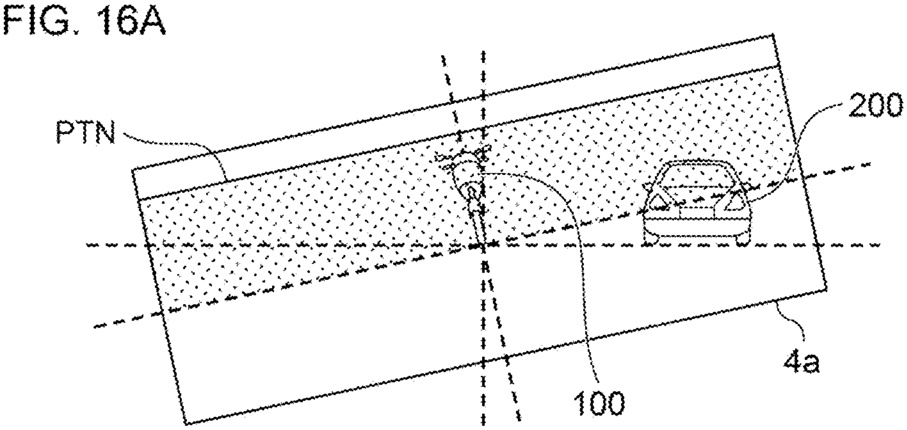
FIGS. 16A, 16B, and 16C are illustrations for describing a case in which the basic operation is performed while a host vehicle is tilted sideways.

Next, how a structuring element is adjusted when the host vehicle 100 becomes tilted sideways will be described. FIGS. 16A to 16C and FIGS. 17A to 17C are illustrations for describing a case in which the basic operation is performed while the host vehicle 100 is tilted sideways. As described above, the vehicle detecting device 6 detects a front vehicle 200 based on the positional relationship of two luminous points 202 relative to each other. In this control, when the attitude of the host vehicle 100 becomes tilted in the right-left direction, this can create a situation in which a front vehicle 200 cannot be detected. Specifically, when the host vehicle 100 becomes tilted sideways as shown in FIG. 16A, the imaging region 4*a* of the imaging device 4 provided in the host vehicle 100 also becomes tilted sideways. In particular, if the host vehicle 100 is a straddle-type vehicle, the host vehicle 100 banks greatly to the right and left when traveling on a curved road. Therefore, the imaging region 4*a* tends to tilt greatly as well.

Figure 16B:
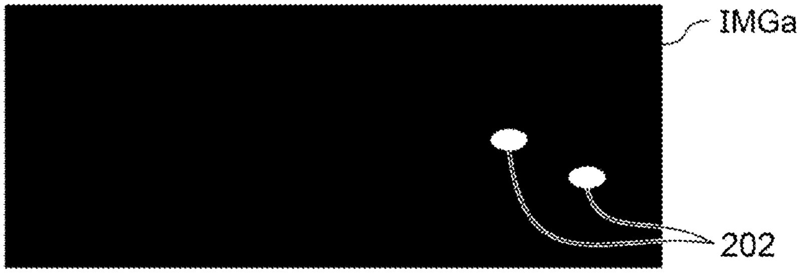
Figure 16C:

An image IMG obtained when the imaging region 4*a* is tilted sideways is an image that is tilted with respect to the ground surface. Therefore, in a luminous point image IMGa obtained from this image IMG, two luminous points 202 corresponding to lamps of the front vehicle 200 become offset from each other in the up-down direction, as shown in FIG. 16B. If the horizontal dilation process is performed on this luminous point image IMGa with the use of the first structuring element 34, the two dilated luminous points 202 fail to be coupled to each other, and two horizontally dilated regions 36 may be generated, as shown in FIG. 16C. Accordingly, vehicle detection performed with the use of such a luminous point image IMGa cannot detect a front vehicle 200 even when the front vehicle 200 is actually present. Therefore, a light distribution pattern PTN that includes a shaded region 24 to overlap the front vehicle 200 cannot be formed.

Figure 17A:
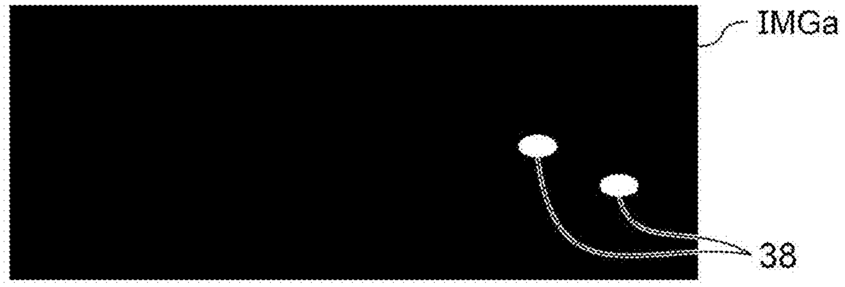
FIGS. 17A, 17B, and 17C are illustrations for describing a case in which the basic operation is performed while a host vehicle is tilted sideways.
Figure 17B:
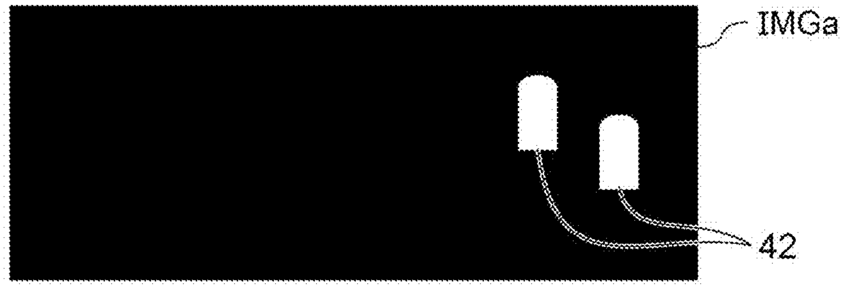
Figure 17C:
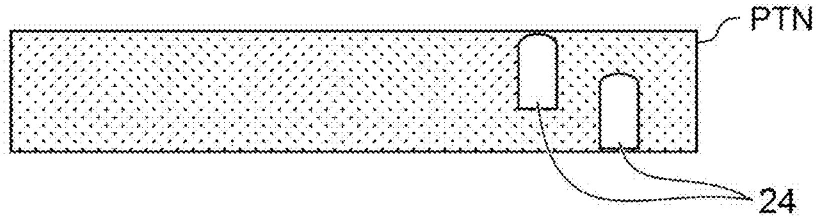

Furthermore, the process of setting a shaded region 24 described above may be executed even when no front vehicle 200 can be detected. In this case, however, the reduction of glare caused on the driver of the front vehicle 200 may be insufficient. In other words, when a horizontal erosion process is performed on a luminous point image IMGa including two horizontally dilated regions 36 with the use of the first structuring element 34, a luminous point image IMGa that includes two horizontally eroded regions 38 is generated, as shown in FIG. 17A. Furthermore, when a vertical dilation process is performed on this luminous point image IMGa with the use of the second structuring element 40, a luminous point image IMGa that includes two vertically dilated regions 42 is generated, as shown in FIG. 17B. When a shaded region 24 is set based on the positions of the vertically dilated regions 42 in this luminous point image IMGa, a light distribution pattern PTN that includes two separate shaded regions 24 is set, as shown in FIG. 17C. With this light distribution pattern PTN, the driver of the front vehicle 200 may be illuminated with the light.

Accordingly, the vehicle detecting device 6 according to the present embodiment, in accordance with a change in the angle of tilt (bank angle) of the vehicle's right-left axis with respect to a horizontal line, modifies the first structuring element 34 so as to absorb an offset between luminous points 202 in a luminous point image IMGa caused by the change.

Specifically, the measurement result sent from the attitude sensor 10 to the vehicle detecting device 6 is acquired by the element adjusting unit 32. Based on the acquired measurement result, the element adjusting unit 32 can detect a change in the angle of tilt of the host vehicle 100. The element adjusting unit 32, in response to detecting a change in the angle of tilt of the host vehicle 100, modifies the first structuring element 34 so as to increase the permitted offset amount between two luminous points 202 in the up-down direction in a luminous point image IMGa (i.e., the offset amount between two luminous points 202, in the up-down direction, that can be coupled to each other by the first structuring element 34). Thus, two luminous points 202 offset in the up-down direction due to the tilting of the host vehicle 100 can more easily be coupled by the first structuring element 34.

FIGS. 18A to 18E are illustrations for describing how the structuring element is adjusted. When the angle of tilt of the right-left axis of the host vehicle 100 is a first angle with respect to a horizontal line, the dimension of the first structuring element 34 in the up-down direction of the vehicle, or in other words, the dimension of the first structuring element 34 in the up-down direction of the image is a first dimension H1. For example, the first structuring element 34 of the first dimension H1 is held by default in the vehicle detecting device 6. When the host vehicle 100 is substantially not tilted, that is, when the angle of tilt of the vehicle's right-left axis is about 0 degrees (first angle≈0 degrees), the detection unit 14 detects a front vehicle 200 using the first structuring element 34 of the first dimension H1.

Figure 18A:
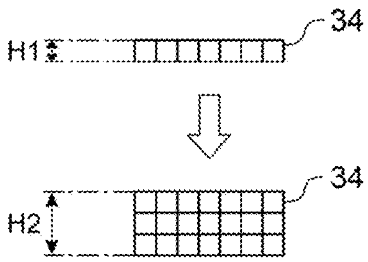
FIGS. 18A, 18B, 18C, 18D, and 18E are illustrations for describing how a structuring element is adjusted.

When the host vehicle 100 becomes tilted sideways and the angle of tilt of its right-left axis becomes a second angle greater than the first angle with respect to a horizontal line, the element adjusting unit 32 sets the dimension of the first structuring element 34 in the up-down direction of the vehicle to a second dimension H2 greater than the first dimension H1, as shown in FIG. 18A. For example, the element adjusting unit 32 holds, in advance, a threshold of the angle of tilt of the vehicle's right-left axis, and when the angle of tilt of the host vehicle 100 has exceeded the threshold, the element adjusting unit 32 expands the dimension of the first structuring element 34 in the up-down direction from the first dimension H1 to the second dimension H2. This threshold can be set as appropriate based on an experiment or simulation conducted by an engineer. Expanding the dimension of the first structuring element 34 in the up-down direction from the first dimension H1 to the second dimension H2 corresponds to making an adjustment to absorb an offset between two luminous points 202 in the up-down direction. Herein, as long as at least a portion of the first structuring element 34 is expanded upward or downward, such expanding corresponds to condition relaxation.

Figure 18B:
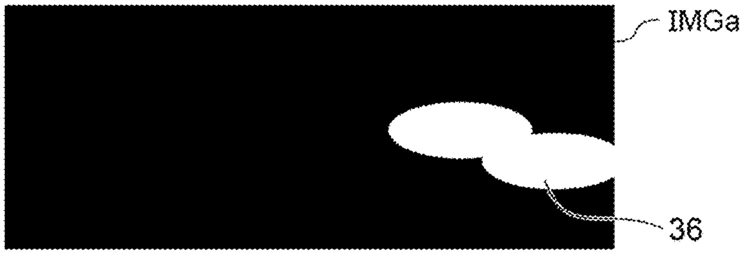

The detection unit 14 performs a horizontal dilation process on a luminous point image IMGa using the first structuring element 34 of the second dimension H2. In this horizontal dilation process, for example, the pixel at the center of the first structuring element 34 in the right-left direction and also at the center in the up-down direction is mapped to each pixel of interest of the luminous point image IMGa. Then, if any one of the pixels that the first structuring element 34 overlaps is a pixel of high pixel value, the pixel value of the pixel of interest is converted to this high pixel value. Thus, two luminous points 202 become dilated in the right-left direction as well as in the up-down direction, as shown in FIG. 18B. As a result, the two luminous points 202 become coupled to each other, and a single horizontally dilated region 36 is generated. As the up-down dimension of the first structuring element 34 is expanded from the first dimension H1 to the second dimension H2 in this manner, even when two luminous points 202 are offset in the up-down direction, the two luminous points 202 can be coupled to each other. Hence, even when the host vehicle 100 becomes tilted sideways, a front vehicle 200 can be detected with high accuracy.

Figure 18C:
Figure 18D:
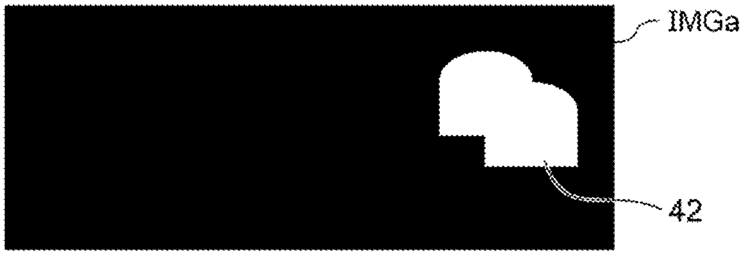
Figure 18E:
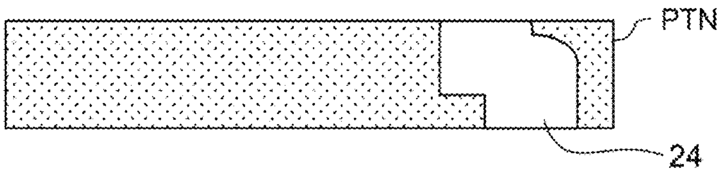

The detection unit 14 also performs a horizontal erosion process on a luminous point image IMGa using the first structuring element 34 of the second dimension H2. Thus, a luminous point image IMGa that includes a single horizontally eroded region 38 is generated, as shown in FIG. 18C. The pattern determining unit 18 performs a vertical dilation process on this luminous point image IMGa using the second structuring element 40. Thus, a luminous point image IMGa that includes a single vertically dilated region 42 is generated, as shown in FIG. 18D. Then, the pattern determining unit 18 sets a shaded region 24 based on the position of the vertically dilated region 42 in this luminous point image IMGa. As a result, a light distribution pattern PTN that includes a shaded region 24 to overlap the driver of the front vehicle 200 can be formed ahead of the host vehicle, as shown in FIG. 18E.

Herein, when the host vehicle 100 is tilted at a first angle greater than 0 degrees, vehicle detection may be performed with the use of the first structuring element 34 of the first dimension H1, and when the host vehicle 100 becomes further tilted at a second angle greater than the first angle, vehicle detection may be performed with the use of the first structuring element 34 of the second dimension H2. Furthermore, the element adjusting unit 32 may expand the dimension of the first structuring element 34 in the up-down direction continuously or stepwise including three or more steps, in accordance with a change in the angle of tilt of the vehicle's right-left axis. In other words, the up-down dimension of the first structuring element 34 may be increased as the angle of tilt of the host vehicle 100 increases.

Figure 19:
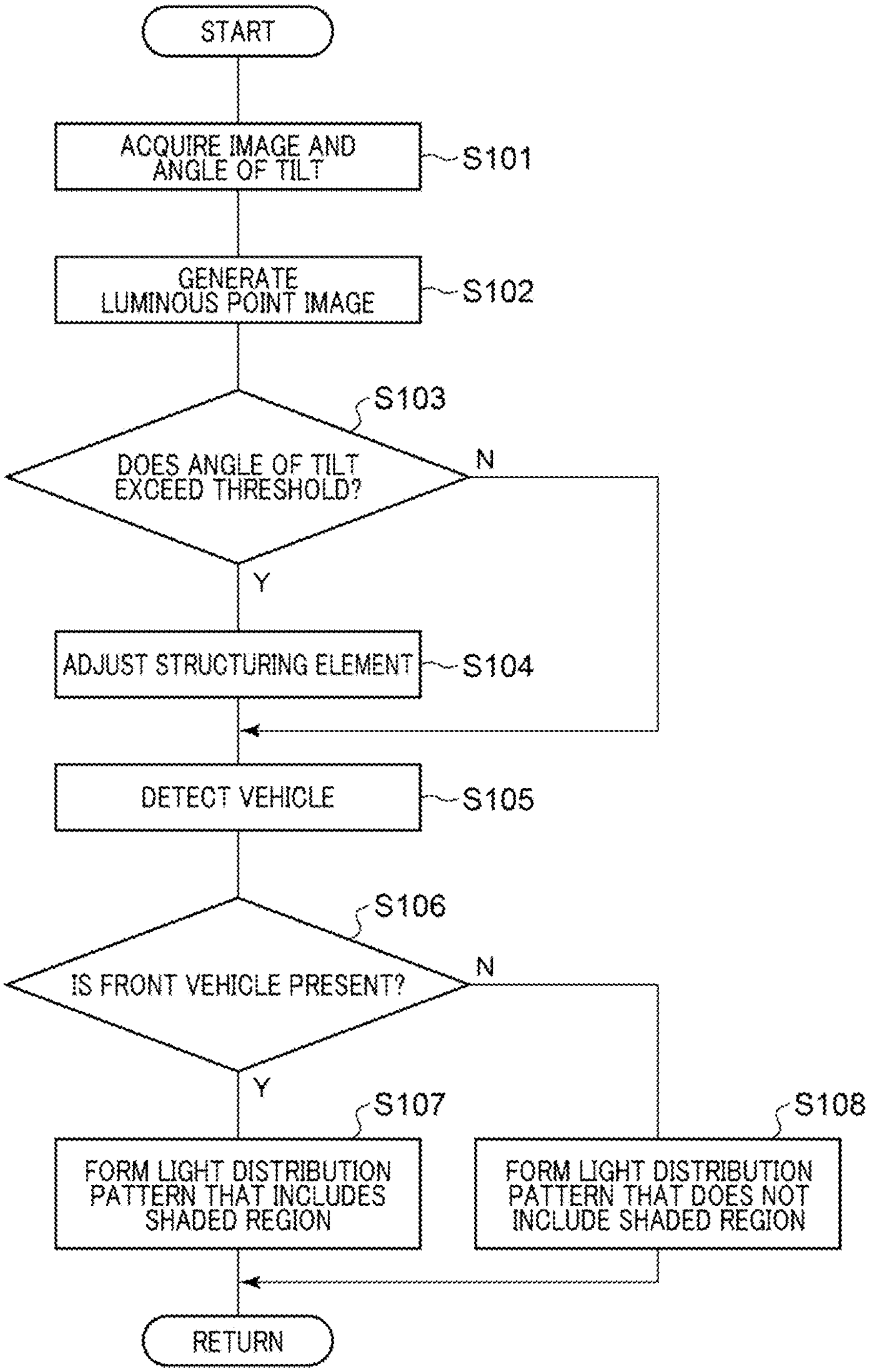
FIG. 19 is a flowchart for describing one example of control executed by a vehicle detecting device and a light distribution controlling device.

FIG. 19 is a flowchart for describing one example of control executed by the vehicle detecting device 6 and the light distribution controlling device 8. This flow is executed repeatedly at predetermined timings, for example, when the execution of ADB control is instructed via a light switch (not shown) and when the ignition is on.

First, the vehicle detecting device 6 acquires an image IMG from the imaging device 4. The vehicle detecting device 6 also acquires the angle of tilt of the host vehicle 100 from the attitude sensor 10 (S101). Then, the vehicle detecting device 6 generates a luminous point image IMGa from the image IMG (S102). Next, the vehicle detecting device 6 determines whether the angle of tilt of the right-left axis of the host vehicle 100 is greater than a threshold (S103). If the angle of tilt is greater than the threshold (Y at S103), the vehicle detecting device 6 adjusts the up-down dimension of the first structuring element 34 (S104), and proceeds to step S105. If the angle of tilt is not greater than the threshold (N at S103), the vehicle detecting device 6 proceeds to step S105 without adjusting the first structuring element 34.

Next, the vehicle detecting device 6 performs a vehicle detecting process on the luminous point image IMGa using the first structuring element 34 (S105). Then, the vehicle detecting device 6 determines whether a front vehicle 200 is present based on the result of the vehicle detecting process (S106). If a front vehicle 200 is present (Y at S106), the light distribution controlling device 8 controls the light distribution variable lamp 2 so as to form a light distribution pattern PTN that includes a shaded region 24 (S107), and terminates the present routine. If no front vehicle 200 is present (N at S106), the light distribution controlling device 8 controls the light distribution variable lamp 2 so as to form a light distribution pattern PTN that does not include a shaded region 24 (S108), and terminates the present routine.

As described above, the vehicle detecting device 6 according to the present embodiment performs, using a first structuring element 34 of a predetermined shape, a dilation process on a luminous point 202 included in an image IMG (a luminous point image IMGa according to the present embodiment) that is based on the imaging device 4 provided in the host vehicle 100, and when there is another dilated luminous point 202 to be coupled to the dilated luminous point 202, the vehicle detecting device 6 detects a front vehicle 200 based on these two luminous points 202. Furthermore, the vehicle detecting device 6, in accordance with a change in the angle of tilt of the vehicle's right-left axis with respect to a horizontal line, modifies the first structuring element 34 so as to absorb an offset between two luminous points 202 in the image IMG caused by the change. As the first structuring element 34 for coupling two luminous points 202 is adjusted dynamically in accordance with the tilt of the host vehicle 100 in this manner, failing to detect a front vehicle 200 can be suppressed. Accordingly, the accuracy of detecting a front vehicle 200 can be increased.

The vehicle detecting device 6 according to the present embodiment sets the dimension of the first structuring element 34 in the up-down direction of the vehicle to the first dimension H1 when the angle of tilt of the host vehicle 100 is the first angle, and sets the dimension of the first structuring element 34 in the up-down direction of the vehicle to the second dimension H2 greater than the first dimension H1 when the angle of tilt is the second angle greater than the first angle. As the first structuring element 34 is made relatively small when the angle of tilt of the host vehicle 100 is relatively small and the first structuring element 34 is made relatively large when the angle of tilt is relatively large as described above, the processing load on the vehicle detecting device 6 can be reduced, as compared to the case of performing vehicle detection using the first structuring element 34 that is large by default regardless of the angle of tilt of the host vehicle 100. Furthermore, the above can suppress erroneous determination that a luminous point 202 that is not of a front vehicle 200 is determined to have come from a front vehicle 200.

The host vehicle 100 provided with the vehicle detecting device 6 according to the present embodiment is a straddle-type vehicle. The vehicle's right-left axis of a straddle-type vehicle tends to become tilted to a greater extent than that of a typical four-wheeled automobile. Therefore, the vehicle detecting device 6 can exhibit its functionality effectively especially in straddle-type vehicles. Herein, the host vehicle 100 may be a vehicle other than a straddle-type vehicle, such as a four-wheeled automobile.

The light distribution controlling device 8 according to the present embodiment sets a light distribution pattern PTN that includes a shaded region 24 to overlap a front vehicle 200, based on a detection result of the vehicle detecting device 6. This configuration makes it possible to achieve, with higher accuracy, both the reduction of glare caused on the driver of a front vehicle 200 and the improvement in the visibility of the driver of the host vehicle 100. Accordingly, safety in vehicle driving can be improved.

Thus far, Embodiment 3 according to the present invention has been described in detail. The embodiment described above merely illustrates a specific example for implementing the present invention. The contents of the embodiment do not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiment described above, the expressions "according to the present embodiment," "in the present embodiment," and so on are added for emphasis to the content that can be subjected to such a design change as described above, but such a design change is also permitted on the content without these expressions. Any desired combination of the constituent elements described above is also valid as an aspect of the present invention. Hatching added along a section in the drawings does not limit the material of such with hatching.

The invention according to Embodiment 3 described above may be identified by the items indicated below.

[First Item]

A vehicle detecting device (6) that:

performs, using a structuring element (34) of a predetermined shape, a dilation process on a luminous point (202) included in an image (IMG, IMGa) that is based on an imaging device (4) provided in a host vehicle (100), and when there is another dilated luminous point (202) to be coupled to the dilated luminous point (202), detects a front vehicle (200) based on the two luminous points (202); and in accordance with a change in an angle of tilt of the vehicle's right-left axis, modifies the structuring element (34) so as to absorb an offset between the luminous points (202) in the image (IMG, IMGa) caused by the change.

[Second Item]

The vehicle detecting device (6) according to First Item, wherein the vehicle detecting device (6) sets a dimension of the structuring element (34) in the up-down direction of the vehicle to a first dimension (H1) when the angle of tilt is a first angle, and sets the dimension of the structuring element (34) in the up-down direction of the vehicle to a second dimension (H2) greater than the first dimension (H1) when the angle of tilt is a second angle greater than the first angle.

[Third Item]

The vehicle detecting device (6) according to First Item or Second Item, wherein the vehicle (100) is a straddle-type vehicle.

[Fourth Item]

A light distribution controlling device (8) that:

based on a detection result of the vehicle detecting device (6) according to any one of First Item to Third Item, sets a light distribution pattern (PTN) that includes a shaded region (24) to overlap the front vehicle (200).

[Fifth Item]

A vehicle detecting method including:

by using a structuring element (34) of a predetermined shape, performing a dilation process on a luminous point (202) included in an image (IMG, IMGa) that is based on an imaging device (4) provided in a host vehicle (100), and when there is another dilated luminous point (202) to be coupled to the dilated luminous point (202), detecting a front vehicle (200) based on the two luminous points (202); and in accordance with a change in an angle of tilt of the vehicle's right-left axis, modifying the structuring element (34) so as to absorb an offset between the luminous points (202) in the image (IMG, IMGa) caused by the change.

Embodiment 4

Figure 20:
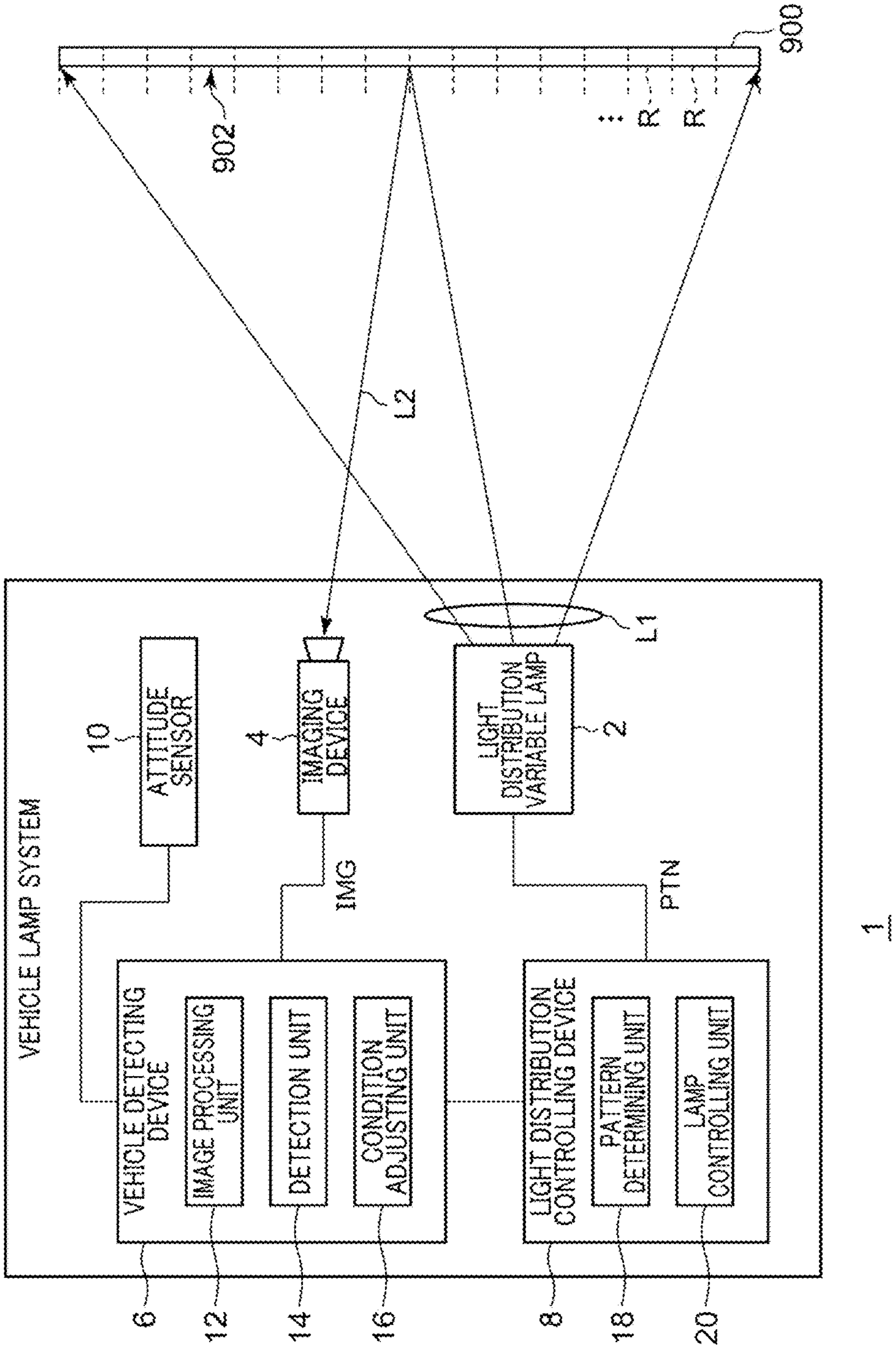
FIG. 20 is a block diagram of a vehicle lamp system according to Embodiment 4.

FIG. 20 is a block diagram of a vehicle lamp system 1. FIG. 20 depicts constituent elements of the vehicle lamp system 1 in the form of functional blocks. These functional blocks are implemented, as to their hardware configuration, by elements or circuits, such as a CPU or memory of a computer, or implemented, as to their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, a vehicle detecting device 6, a light distribution controlling device 8, and an attitude sensor 10. These components are provided in a vehicle. A vehicle in which the vehicle lamp system 1 is provided according to the present embodiment is a straddle-type vehicle, such as a motorcycle. The light distribution variable lamp 2, the imaging device 4, the vehicle detecting device 6, the light distribution controlling device 8, and the attitude sensor 10 may all be contained within a single housing, or some of these members may be provided outside such a housing.

For example, the light distribution variable lamp 2, the imaging device 4, the vehicle detecting device 6, the light distribution controlling device 8, and the attitude sensor 10 are housed in a lamp room. The lamp room is defined by a lamp body having an opening that opens to the front side of the vehicle and a light-transmissive cover attached so as to cover the opening of the lamp body. The imaging device 4, the vehicle detecting device 6, the light distribution controlling device 8, and the attitude sensor 10 may be provided outside the lamp room, such as in the vehicle. In this case, the imaging device 4 may be an onboard camera. The vehicle detecting device 6 and the light distribution controlling device 8 may be, for example, entirely or partly constituted by a vehicle ECU.

The light distribution variable lamp 2 is capable of illuminating a region ahead of the host vehicle with a visible light beam L1 of a variable intensity distribution. The light distribution variable lamp 2 is enabled to vary the illuminance of light in a plurality of illuminated individual regions R arrayed ahead of the vehicle independently of each other. The plurality of individual regions R are arrayed, for example, in a matrix. The light distribution variable lamp 2 receives information instructing on a light distribution pattern PTN from the light distribution controlling device 8 and emits a visible light beam L1 having an intensity distribution corresponding to the light distribution pattern PTN. Thus, the light distribution pattern PTN is formed ahead of the host vehicle. A light distribution pattern PTN can be understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the space ahead of the host vehicle with light from a light source. In an alternative configuration, illumination of light directed to the region ahead of the host vehicle may be blocked partly by a shading plate.

The imaging device 4 has a sensitivity to a visible light range and repeatedly captures an image of the region ahead of the host vehicle. The imaging device 4 captures an image of reflected light L2 of a visible light beam L1 reflected from an object located ahead of the vehicle. The imaging device 4 also captures an image of light from a front vehicle, including a leading vehicle and an oncoming vehicle. An image IMG that the imaging device 4 generates is sent to the vehicle detecting device 6.

An image IMG that the vehicle detecting device 6 acquires from the imaging device 4 may be RAW image data or image data subjected to predetermined image processing by the imaging device 4. When the vehicle detecting device 6 receives image data resulting from subjecting RAW image data generated by the imaging device 4 to image processing performed by a processing device other than the imaging device 4, this receiving also corresponds to the acquiring of an image IMG from the imaging device 4. In the following description, "an image IMG that is based on the imaging device 4" may mean either of RAW image data and data subjected to image processing. Furthermore, the expression "image IMG" may be used without any distinction between the two types of image data.

The vehicle detecting device 6 detects a front vehicle using an image IMG that is based on the imaging device 4. The vehicle detecting device 6 sends its detection result to the light distribution controlling device 8. Herein, the vehicle detecting device 6 may detect a target aside from a front vehicle. The vehicle detecting device 6 can be constituted by a digital processor, and for example, the vehicle detecting device 6 may be constituted by a combination of a microcomputer including a CPU and a software program or by a field programmable gate array (FPGA), an application specific IC (ASIC), or the like. The vehicle detecting device 6 includes, in one example, an image processing unit 12, a detection unit 14, and a condition adjusting unit 16. Each of these units operates as an integrated circuit constituting itself executes a program stored in a memory. An operation of each of these units will be described later.

The light distribution controlling device 8 executes ADB control of dynamically and adaptively controlling the light distribution of the light distribution variable lamp 2 in accordance with a target present in the region ahead. The light distribution controlling device 8 according to the present embodiment sets a light distribution pattern PTN that includes a shaded region to overlap a front vehicle, based on a detection result of the vehicle detecting device 6. The light distribution controlling device 8 sends information instructing on a light distribution pattern PTN to the light distribution variable lamp 2. The light distribution controlling device 8 can be constituted by a digital processor, and for example, the light distribution controlling device 8 may be constituted by a combination of a microcomputer including a CPU and a software program or by a field programmable gate array (FPGA), an application specific IC (ASIC), or the like. The light distribution controlling device 8 includes, in one example, a pattern determining unit 18 and a lamp controlling unit 20. Each of these units operates as an integrated circuit constituting itself executes a program stored in a memory. An operation of each of these units will be described later.

The attitude sensor 10 measures the tilt of the host vehicle in the right-left direction. That is, the attitude sensor 10 measures the angle of tilt of the vehicle's right-left axis with respect to a horizontal line or a vertical line (in other words, the angle of tilt of the vehicle's up-down axis with respect to a horizontal line or a vertical line). The attitude sensor 10 is constituted, for example but not limited to, by a known inertial measurement unit (IMU). The attitude sensor 10 sends its measurement result to the vehicle detecting device 6.

Figure 21A:
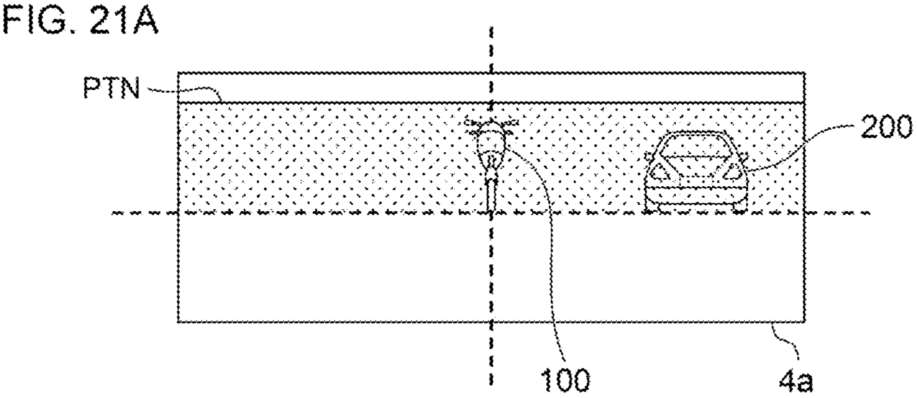
FIGS. 21A, 21B, 21C, and 21D are illustrations for describing a basic operation of vehicle detection and light distribution control.

Next, an operation of the vehicle detecting device 6 and of the light distribution controlling device 8 will be described. FIGS. 21A, 21B, 21C and 21D are illustrations for describing a basic operation of vehicle detection and light distribution control. FIG. 21A shows a host vehicle 100, an imaging region 4*a* of the imaging device 4, and a light distribution pattern PTN formed in the region ahead of the host vehicle 100. In this example, a high beam light distribution pattern is shown as one example of the light distribution pattern PTN.

Figure 21B:
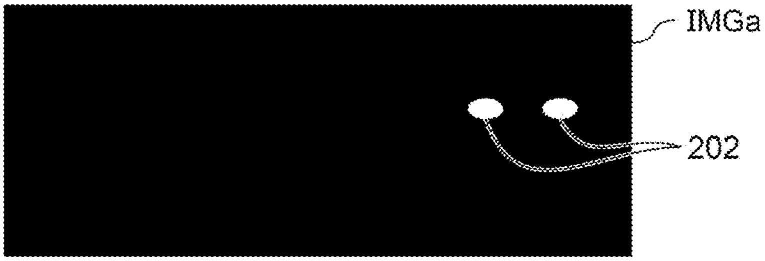

When a front vehicle 200 is present in the region ahead of the host vehicle 100, an image IMG that includes the front vehicle 200 is generated by the imaging device 4 and sent to the vehicle detecting device 6. The image IMG sent to the vehicle detecting device 6 is acquired by the image processing unit 12. The image processing unit 12 performs known image processing, such as binarization, on the image IMG. This image processing generates a luminous point image IMGa in which two luminous points 202 corresponding to lamps of the front vehicle 200 are extracted, as shown in FIG. 21B. The lamps of the front vehicle 200 are rear lamps or the like if the front vehicle 200 is a leading vehicle, or they are headlamps or the like if the front vehicle 200 is an oncoming vehicle. A rear lamp includes a stop lamp and a tail lamp. The image processing unit 12 sends the generated luminous point image IMGa to the detection unit 14.

Figure 21C:
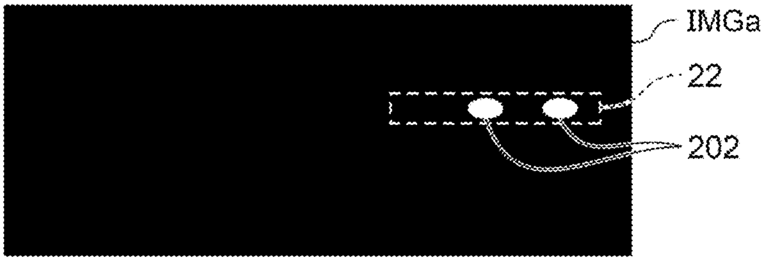

The detection unit 14 determines the presence of the front vehicle 200 using the luminous point image IMGa. The detection unit 14 stores therein a predetermined pair determining condition set in advance. Then, as shown in FIG. 21C, the detection unit 14 compares each luminous point 202 included in the luminous point image IMGa against the pair determining condition. When two luminous points 202 included in the luminous point image IMGa satisfy the pair determining condition, the detection unit 14 detects a front vehicle 200 based on these two luminous points 202. When two luminous points 202 that satisfy the pair determining condition are present in a luminous point image IMGa, the detection unit 14 according to the present embodiment determines that these two luminous points 202 are derived from a front vehicle 200, or in other words, determines that a front vehicle 200 is present at the positions there these two luminous points 202 are present.

The detection unit 14 according to the present embodiment holds therein information about a rectangular frame 22 elongated in the horizontal direction of the luminous point image IMGa, as a determination element of the pair determining condition. The pair determining condition is satisfied when two luminous points 202 are contained within the frame 22 in a luminous point image IMGa. In other words, when two luminous points 202 are contained within the frame 22, these two luminous points 202 are determined to be of a front vehicle 200. Normally, when an image of a leading vehicle's rear lamps or an oncoming vehicle's headlamps is captured, these lamps appear, in an image IMG, as two luminous points 202 that are present at the same height while spaced apart horizontally by a predetermined gap therebetween. Therefore, a front vehicle 200 can be detected based on the positional relationship of two luminous points 202 within an image IMG.

Specifically, the detection unit 14 superposes the frame 22 on each luminous point 202 in the luminous point image IMGa so that the luminous point 202 is contained within the frame 22. Then, the detection unit 14 moves each frame 22 in the right-left direction through raster processing. When two luminous points 202 are contained within a single frame 22, the detection unit 14 determines these two luminous points 202 as a front vehicle 200. FIG. 21C shows a state in which the luminous points 202 on the right is contained within the frame 22 set for the luminous point 202 on the left. The detection unit 14 sends its detection result to the light distribution controlling device 8.

Figure 21D:
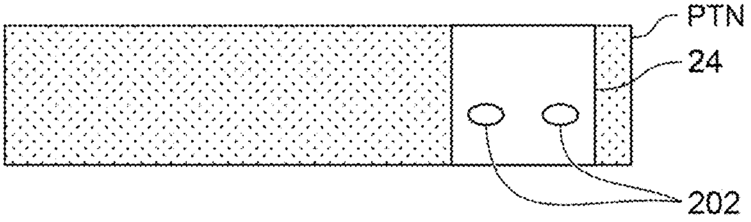

The detection result sent to the light distribution controlling device 8 is acquired by the pattern determining unit 18. When a front vehicle 200 has been detected, the pattern determining unit 18 sets a shaded region 24 to overlap the front vehicle 200 in a light distribution pattern that serves as a base, as shown in FIG. 21D. Thus, a light distribution pattern PTN to be formed is determined. A shaded region 24 is a portion of a light distribution pattern PTN where the luminance (illuminance) is zero or a portion of a light distribution pattern PTN where the luminance is reduced to higher than zero but lower than that held prior to shading. When no front vehicle 200 is detected, the pattern determining unit 18 sets a light distribution pattern PTN that does not include a shaded region 24.

A light distribution pattern that serves as a base is selected in accordance with a light distribution mode that is set based, for example, on the driver's instruction input by operating the light switch (not shown), the traveling state of the host vehicle, or the environment surrounding the host vehicle. For example, light distribution modes include, for example, a high beam mode of forming a high beam light distribution pattern, a low beam mode of forming a low beam light distribution pattern, and a town mode of forming a light distribution pattern suitable for traveling in a city area. FIG. 21D shows a high beam light distribution pattern as one example. The pattern determining unit 18 sends information about the determined light distribution pattern PTN to the lamp controlling unit 20.

The lamp controlling unit 20 instructs the light distribution variable lamp 2 to form the light distribution pattern PTN. The lamp controlling unit 20 is constituted, for example, by a known LED driver module (LDM). If the light sources of the light distribution variable lamp 2 are controlled by analog dimming, the lamp controlling unit 20 adjusts the direct current level of the driving current flowing in the light sources. Meanwhile, if the light sources are controlled by pulse width modulation (PWM) dimming, the lamp controlling unit 20 adjusts the mean level of the driving current by switching the current that flows in the light sources to adjust the ratio of the on periods. If the light distribution variable lamp 2 includes a DMD, the lamp controlling unit 20 may control the on/off switching of each mirror element constituting the DMD. If the lamp controlling unit 20 includes a liquid-crystal device, the lamp controlling unit 20 may control the optical transmittance of the liquid-crystal device. Thus, the light distribution pattern PTN is formed ahead of the host vehicle.

Next, how the pair determining condition is adjusted when the host vehicle 100 becomes tilted sideways will be described. FIGS. 22A, 22B, 22C and 22D are illustrations for describing a case in which the basic operation is performed while the host vehicle 100 is tilted sideways. As described above, the vehicle detecting device 6 detects a front vehicle 200 based on the positional relationship of two luminous points 202 relative to each other. In this control, when the attitude of the host vehicle 100 becomes tilted in the right-left direction, this can create a situation in which a front vehicle 200 cannot be detected. Specifically, when the host vehicle 100 becomes tilted sideways as shown in FIG.

22A, the imaging region 4*a* of the imaging device 4 provided in the host vehicle 100 also becomes tilted sideways. In particular, if the host vehicle 100 is a straddle-type vehicle, the host vehicle 100 banks greatly to the right and left when traveling on a curved road. Therefore, the imaging region 4*a* tends to tilt greatly as well.

Figure 22A:
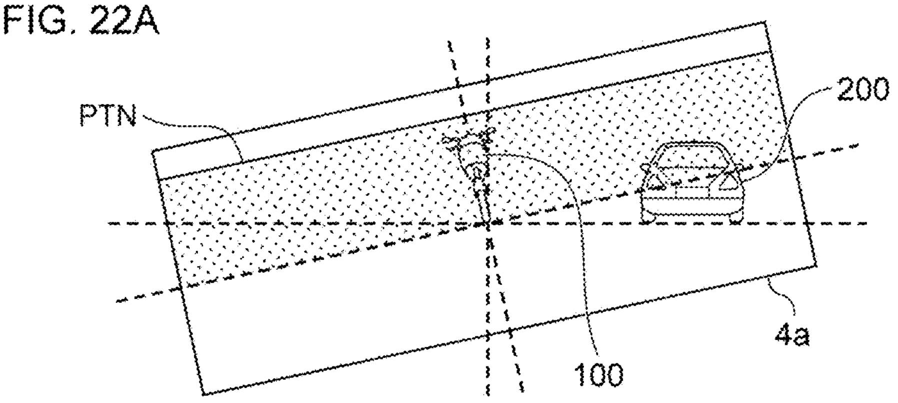
FIGS. 22A, 22B, 22C, and 22D are illustrations for describing a case in which the basic operation is performed while a host vehicle is tilted sideways.
Figure 22B:
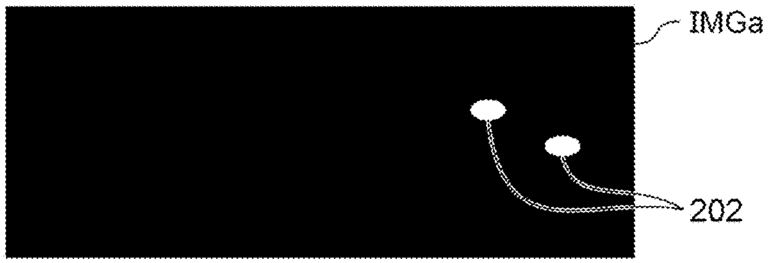
Figure 22C:
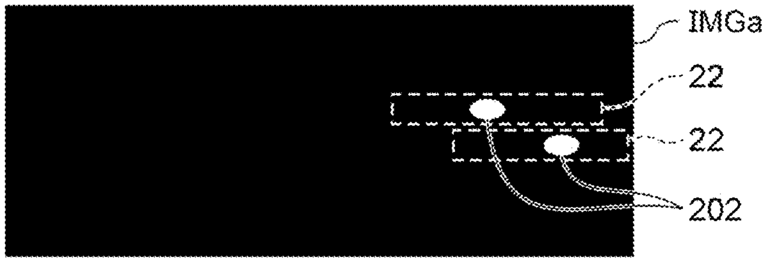
Figure 22D:
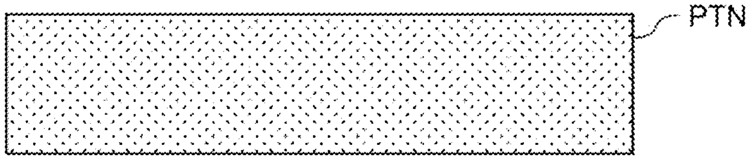

An image IMG obtained when the imaging region 4*a* is tilted sideways is an image that is tilted with respect to the ground surface. Therefore, in a luminous point image IMGa obtained from this image IMG, two luminous points 202 corresponding to lamps of the front vehicle 200 become offset from each other in the up-down direction, as shown in FIG. 22B. In vehicle detection using this luminous point image IMGa, the two luminous points 202 are not contained in either of the frames 22 superposed on the respective luminous points 202, as shown in FIG. 22C. Therefore, even though a front vehicle 200 is actually present, this front vehicle 200 cannot be detected. As a result, a light distribution pattern PTN that includes no shaded region 24 is set, as shown in FIG. 22C.

Accordingly, the vehicle detecting device 6 according to the present embodiment, in accordance with a change in the angle of tilt (bank angle) of the vehicle's right-left axis with respect to a horizontal line, relaxes the pair determining condition so as to absorb an offset between luminous points 202 in a luminous point image IMGa caused by the change.

Specifically, the measurement result sent from the attitude sensor 10 to the vehicle detecting device 6 is acquired by the condition adjusting unit 16. Based on the acquired measurement result, the condition adjusting unit 16 can detect a change in the angle of tilt of the host vehicle 100. The condition adjusting unit 16, in response to detecting a change in the angle of tilt of the host vehicle 100, relaxes, among the constituent elements of the pair determining condition, the element concerning the up-down direction of the luminous point image IMGa. In other words, the condition adjusting unit 16 increases the permitted offset amount (the offset amount permitted to satisfy the pair determining condition) with respect to the offset between two luminous points 202 in the up-down direction in a luminous point image IMGa. Thus, two luminous points 202 offset in the up-down direction due to the tilting of the host vehicle 100 become more likely to satisfy the pair determining condition.

Figure 23A:
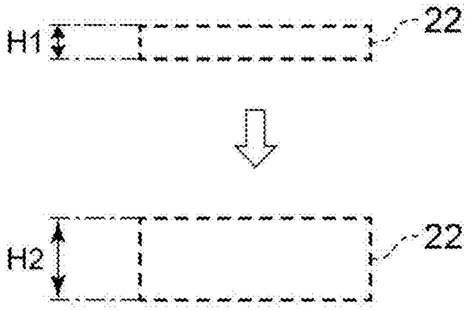
FIGS. 23A, 23B, and 23C are illustrations for describing how a pair determining condition is adjusted.
Figure 23B:
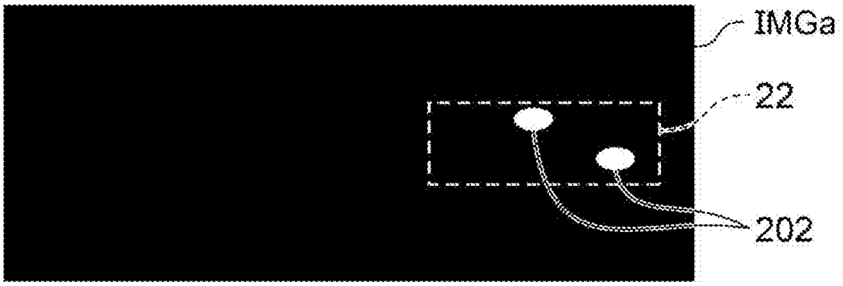
Figure 23C:
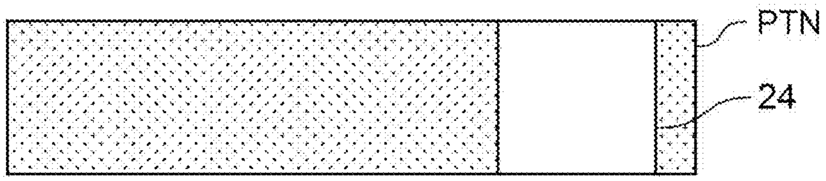

When a frame 22 is used, the pair determining condition is adjusted to be relaxed in the following manner. FIGS. 23A, 23B, and 23C are illustrations for describing how the pair determining condition is adjusted. When the angle of tilt of the right-left axis of the host vehicle 100 is a first angle with respect to a horizontal line, the dimension of the frame 22 in the up-down direction of the vehicle, or in other words, the dimension of the frame 22 in the up-down direction of the image is a first dimension H1. For example, the frame 22 of the first dimension H1 is held by default in the vehicle detecting device 6. When the host vehicle 100 is substantially not tilted, that is, when the angle of tilt of the vehicle's right-left axis is about 0 degrees (first angle≈0 degrees), the detection unit 14 detects a front vehicle 200 using the frame 22 of the first dimension H1.

When the host vehicle 100 becomes tilted sideways and the angle of tilt of its right-left axis becomes a second angle greater than the first angle with respect to a horizontal line, the condition adjusting unit 16 sets the dimension of the frame 22 in the up-down direction of the vehicle to a second dimension H2 greater than the first dimension H1, as shown in FIG. 23A. For example, the condition adjusting unit 16 holds, in advance, a threshold of the angle of tilt of the vehicle's right-left axis, and when the angle of tilt of the host vehicle 100 has exceeded the threshold, the condition adjusting unit 16 expands the dimension of the frame 22 in the up-down direction from the first dimension H1 to the second dimension H2. This threshold can be set as appropriate based on an experiment or simulation conducted by an engineer. Expanding the dimension of the frame 22 in the up-down direction from the first dimension H1 to the second dimension H2 corresponds to the condition relaxation for absorbing an offset between two luminous points 202 in the up-down direction. Herein, as long as either at least a portion of the upper side of the frame 22 is expanded upward or at least a portion of the lower side of the frame 22 is expanded downward, such expanding corresponds to the condition relaxation.

The detection unit 14 superposes the frame 22 of the second dimension H2 on each luminous point 202 in the luminous point image IMGa, as shown in FIG. 23B. As the up-down dimension of the frame 22 is expanded from the first dimension H1 to the second dimension H2, even when two luminous points 202 are offset from each other in the up-down direction, the two luminous points 202 can be made to fit within the frame 22. Hence, even when the host vehicle 100 becomes tilted sideways, a front vehicle 200 can be detected with high accuracy. As a result, a light distribution pattern PTN that includes a shaded region 24 to overlap the front vehicle 200 can be formed ahead of the host vehicle, as shown in FIG. 23C.

Herein, when the host vehicle 100 is tilted at a first angle greater than 0 degrees, vehicle detection may be performed with the use of the frame 22 of the first dimension H1, and when the host vehicle 100 becomes further tilted at a second angle greater than the first angle, vehicle detection may be performed with the use of the frame 22 of the second dimension H2. Furthermore, the condition adjusting unit 16 may relax the element concerning the up-down direction of the image continuously or stepwise including three or more steps, in accordance with a change in the angle of tilt of the vehicle's right-left axis. In other words, the up-down dimension of the frame 22 may be increased as the angle of tilt of the host vehicle 100 increases.

Figure 24:
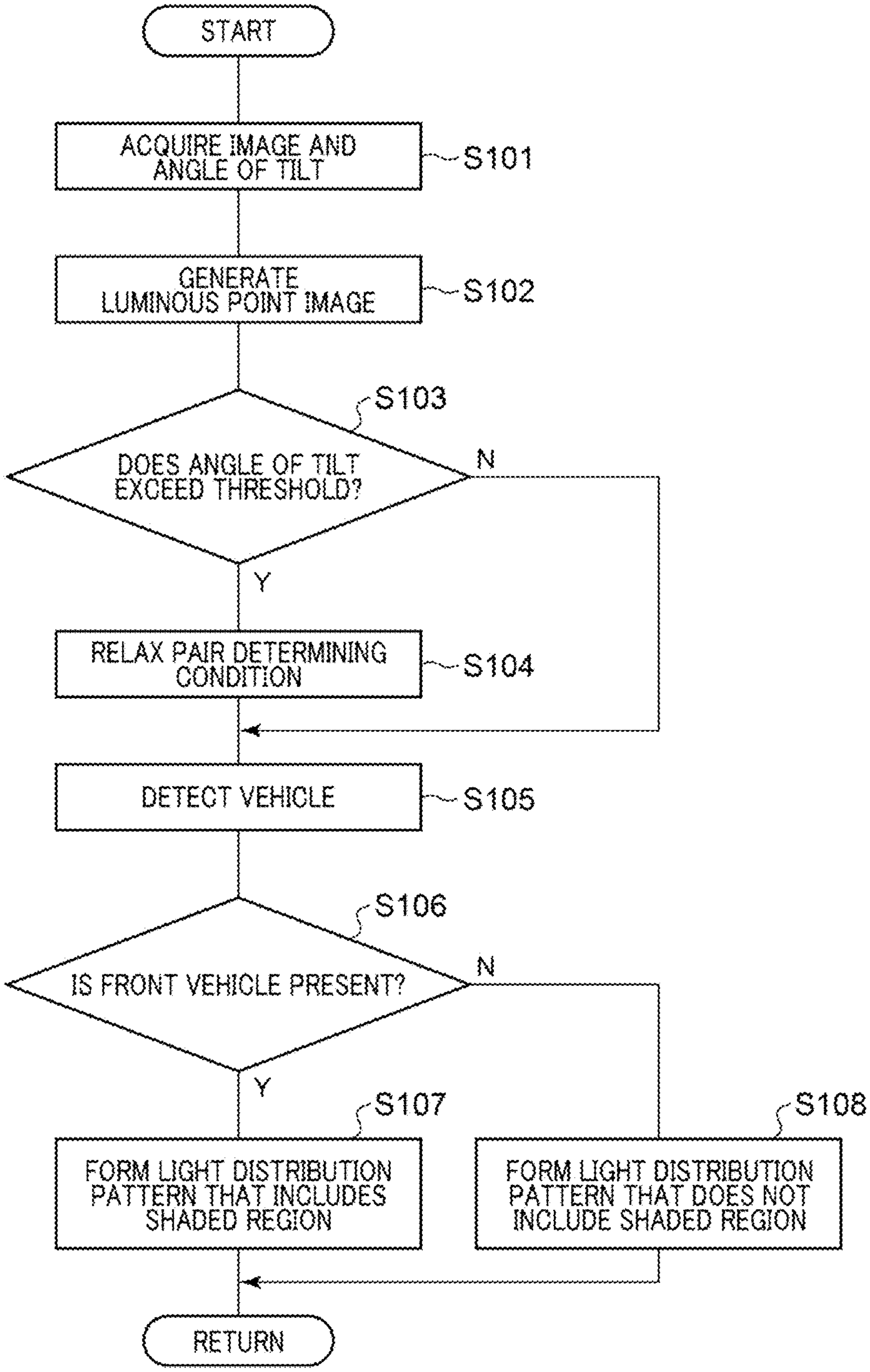
FIG. 24 is a flowchart for describing one example of control executed by a vehicle detecting device and a light distribution controlling device.

FIG. 24 is a flowchart for describing one example of control executed by the vehicle detecting device 6 and the light distribution controlling device 8. This flow is executed repeatedly at predetermined timings, for example, when the execution of ADB control is instructed via a light switch (not shown) and when the ignition is on.

First, the vehicle detecting device 6 acquires an image IMG from the imaging device 4. The vehicle detecting device 6 also acquires the angle of tilt of the host vehicle 100 from the attitude sensor 10 (S101). Then, the vehicle detecting device 6 generates a luminous point image IMGa from the image IMG (S102). Next, the vehicle detecting device 6 determines whether the angle of tilt of the right-left axis of the host vehicle 100 is greater than a threshold (S103). If the angle of tilt is greater than the threshold (Y at S103), the vehicle detecting device 6 relaxes the pair determining condition (S104), and proceeds to step S105. If the angle of tilt is not greater than the threshold (N at S103), the vehicle detecting device 6 proceeds to step S105 without relaxing the pair determining condition.

Next, the vehicle detecting device 6 performs a vehicle detecting process on the luminous point image IMGa using the pair determining condition (S105). Then, the vehicle detecting device 6 determines whether a front vehicle 200 is present based on the result of the vehicle detecting process (S106). If a front vehicle 200 is present (Y at S106), the light distribution controlling device 8 controls the light distribution variable lamp 2 so as to form a light distribution pattern PTN that includes a shaded region 24 (S107), and terminates the present routine. If no front vehicle 200 is present (N at S106), the light distribution controlling device 8 controls the light distribution variable lamp 2 so as to form a light distribution pattern PTN that does not include a shaded region 24 (S108), and terminates the present routine.

As described above, when two luminous points 202 included in an image IMG (a luminous point image IMGa according to the present embodiment) that is based on the imaging device 4 provided in the host vehicle 100 satisfy a predetermined pair determining condition, the vehicle detecting device 6 according to the present embodiment detects a front vehicle 200 based on these two luminous points 202. Furthermore, the vehicle detecting device 6, in accordance with a change in the angle of tilt of the vehicle's right-left axis with respect to a horizontal line, relaxes the pair determining condition so as to absorb an offset between luminous points 202 in the image IMG caused by the change. Adjusting the pair determining condition of luminous points 202 dynamically in accordance with the tilt of the host vehicle 100 as described above makes it possible to avoid missing luminous points 202 derived from a front vehicle 200. Accordingly, the accuracy of detecting a front vehicle 200 can be increased.

The pair determining condition according to the present embodiment is satisfied when two luminous points 202 are contained within a rectangular frame 22 in an image IMG (a luminous point image IMGa according to the present embodiment). Then, the vehicle detecting device 6 sets the dimension of the frame 22 in the up-down direction of the vehicle to the first dimension H1 when the angle of tilt of the host vehicle 100 is the first angle and sets the dimension of the frame 22 in the up-down direction of the vehicle to the second dimension H2 greater than the first dimension H1 when the angle of tilt is the second angle greater than the first angle.

In this manner, according to the present embodiment, a relatively strict pair determining condition is set when the angle of tilt of the host vehicle 100 is relatively small, and a relatively relaxed pair determining condition is set then the angle of tilt is relatively large. Thus, the processing load on the detection unit 14 can be reduced, as compared to the case of performing vehicle detection using a pair determining condition that is relaxed by default regardless of the angle of tilt of the host vehicle 100. Furthermore, the above can suppress erroneous determination that a luminous point 202 that is not of a front vehicle 200 is determined to have come from a front vehicle 200.

The host vehicle 100 provided with the vehicle detecting device 6 according to the present embodiment is a straddle-type vehicle. The vehicle's right-left axis of a straddle-type vehicle tends to become tilted to a greater extent than that of a typical four-wheeled automobile. Therefore, the vehicle detecting device 6 can exhibit its functionality effectively especially in straddle-type vehicles. Herein, the host vehicle 100 may be a vehicle other than a straddle-type vehicle, such as a four-wheeled automobile.

The light distribution controlling device 8 according to the present embodiment sets a light distribution pattern PTN that includes a shaded region 24 to overlap a front vehicle 200, based on a detection result of the vehicle detecting device 6. This configuration makes it possible to achieve, with higher accuracy, both the reduction of glare caused on the driver of a front vehicle 200 and the improvement in the visibility of the driver of the host vehicle 100. Accordingly, safety in vehicle driving can be improved.

Thus far, Embodiment 4 according to the present invention has been described in detail. The embodiment described above merely illustrates a specific example for implementing the present invention. The contents of the embodiment do not limit the technical scope of the present invention, and a number of design changes, including modifications, additions, and deletions of constituent elements, can be made within the scope that does not depart from the sprit of the invention defined by the claims. A new embodiment resulting from adding a design change has advantageous effects of the embodiments combined as well as the advantageous effects of the modification. With regard to the embodiment described above, the expressions "according to the present embodiment," "in the present embodiment," and so on are added for emphasis to the content that can be subjected to such a design change as described above, but such a design change is also permitted on the content without these expressions. Any desired combination of the constituent elements described above is also valid as an aspect of the present invention. Hatching added along a section in the drawings does not limit the material of such with hatching.

The invention according to Embodiment 4 described above may be identified by the items indicated below.

[First Item]

A vehicle detecting device (6) that:

when two luminous points (202) included in an image (IMG, IMGa) that is based on an imaging device (4) provided in a host vehicle (100) satisfy a predetermined pair determining condition, detects a front vehicle (200) based on the two luminous points (202); and in accordance with a change in an angle of tilt of the vehicle's right-left axis, relaxes the pair determining condition so as to absorb an offset between the luminous points (202) in the image (IMG, IMGa) caused by the change.

[Second Item]

The vehicle detecting device (6) according to First Item, wherein the pair determining condition is satisfied when the two luminous points (202) are contained within a rectangular frame (22) in the image (IMG, IMGa), and the vehicle detecting device (6) sets a dimension of the frame (22) in the up-down direction of the vehicle to a first dimension (H1) when the angle of tilt is a first angle, and sets the dimension of the frame (22) in the up-down direction of the vehicle to a second dimension (H2) greater than the first dimension (H1) when the angle of tilt is a second angle greater than the first angle.

[Third Item]

The vehicle detecting device (6) according to First Item or Second Item, wherein the vehicle (100) is a straddle-type vehicle.

[Fourth Item]

A light distribution controlling device (8) that:

based on a detection result of the vehicle detecting device (6) according to any one of First Item to Third Item, sets a light distribution pattern (PTN) that includes a shaded region (24) to overlap the front vehicle (200).

[Fifth Item]

A vehicle detecting method including:

when two luminous points (202) included in an image (IMG, IMGa) that is based on an imaging device (4) provided in a host vehicle (100) satisfy a predetermined pair determining condition, detecting a front vehicle (200) based on the two luminous points (202); and in accordance with a change in an angle of tilt of the vehicle's right-left axis, relaxing the pair determining condition so as to absorb an offset between the luminous points (202) in the image (IMG, IMGa) caused by the change.

What is claimed is:

1. A vehicle detecting device that:

performs a process of detecting two luminous points corresponding to lamps of a front vehicle using a luminous point image generated from an image that is captured by an imaging device provided in a vehicle; and in accordance with a change in an angle of tilt of the vehicle's right-left axis, modifies an imaging region of the imaging device so as to mitigate a shift in the imaging region caused by the change, wherein the vehicle detecting device modifies at least one of a region range of the imaging region in an up-down direction of the vehicle or a region angle of the imaging region, when modifying the region range, the vehicle detecting device sets the region range to a first range when the angle of tilt is a first angle, and sets the region range to a second range greater than the first range when the angle of tilt is a second angle greater than the first angle, and when modifying the region angle, the vehicle detecting device sets the region angle to a third angle when the angle of tilt is the first angle, and sets the region angle to a fourth angle greater than the third angle when the angle of tilt is the second angle greater than the first angle.

2. The vehicle detecting device according to claim 1, wherein the vehicle is a straddle-type vehicle.

3. A light distribution controlling device that:

based on a detection result of the vehicle detecting device according to claim 1, sets a light distribution pattern that includes a shaded region to overlap the front vehicle.

* * * * *